(12) United States Patent
Stiller et al.

(10) Patent No.: US 8,465,561 B2
(45) Date of Patent: *Jun. 18, 2013

(54) HYDROGENATED VEGETABLE OIL IN COAL LIQUEFACTION

(75) Inventors: Alfred H. Stiller, Morgantown, WV (US); Elliot B. Kennel, Morgantown, WV (US)

(73) Assignee: West Virginia University, Morgantown, WV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/165,935

(22) Filed: Jun. 22, 2011

(65) Prior Publication Data

US 2012/0091042 A1   Apr. 19, 2012

Related U.S. Application Data

(63) Continuation-in-part of application No. 11/897,059, filed on Aug. 29, 2007, and a continuation-in-part of application No. 11/805,737, filed on May 24, 2007, now Pat. No. 8,226,816, and a continuation of application No. 13/165,857, filed on Jun. 22, 2011.

(60) Provisional application No. 61/357,323, filed on Jun. 22, 2010, provisional application No. 61/357,332, filed on Jun. 22, 2010.

(51) Int. Cl.
  *C10L 5/00*      (2006.01)

(52) U.S. Cl.
  USPC .............................. 44/627; 208/428; 208/431

(58) Field of Classification Search
  USPC ..................................... 44/627; 208/428, 431
  See application file for complete search history.

(56) References Cited

U.S. PATENT DOCUMENTS

| | | | |
|---|---|---|---|
| 2,681,300 A | * | 6/1954 | Ruidisch et al. .............. 208/431 |
| 3,505,203 A | | 4/1970 | Nelson |
| 3,954,544 A | | 5/1976 | Hooker |
| 3,966,585 A | | 6/1976 | Gray et al. |
| 4,081,361 A | | 3/1978 | Hildebrand et al. |
| 4,092,236 A | | 5/1978 | Heredy |
| 4,177,079 A | | 12/1979 | Espenscheid |

(Continued)

FOREIGN PATENT DOCUMENTS

| JP | 56-072079 | 6/1981 |
|---|---|---|
| JP | 05-230469 | 9/1993 |

OTHER PUBLICATIONS

Dadyburjor et al., "Production of Carbon Products Using a Coal Extraction Process," NETL Contract No. DE-FC26-02NT41596, National Energy Technology Laboratories Final Report Sep. 11, 2002-Aug. 31, 2004, Published Dec. 12, 2005, pp. 1-233, U.S. Department of Energy, Pittsburgh, Pennsylvania.

(Continued)

*Primary Examiner* — Cephia D Toomer
(74) *Attorney, Agent, or Firm* — The Webb Law Firm

(57) ABSTRACT

The present disclosure provides methods and systems for coal liquefaction using a hydrogenated vegetable oil. A method of obtaining a de-ashed coal extract includes exposing a coal to a hydrogenated vegetable oil in the presence of a coal-derived solvent to form a slurry, elevating the temperature of the slurry to facilitate liquefying the coal and liberating a volatile matter, and separating the insoluble components from the slurry to obtain a de-ashed coal extract, wherein the coal extract is suitable for downstream processing.

11 Claims, 18 Drawing Sheets

U.S. PATENT DOCUMENTS

| | | | |
|---|---|---|---|
| 4,179,352 A | 12/1979 | Effron | |
| 4,211,576 A | 7/1980 | Yan | |
| 4,259,171 A | 3/1981 | Stadelhofer et al. | |
| 4,272,356 A | 6/1981 | Stiller et al. | |
| 4,303,496 A | 12/1981 | Rudnick | |
| 4,334,977 A | 6/1982 | Derbyshire et al. | |
| 4,369,171 A | 1/1983 | Grindstaff et al. | |
| 4,394,248 A | 7/1983 | Gatsis | |
| 4,465,495 A | 8/1984 | Scheffee | |
| 4,475,924 A | 10/1984 | Meyer | |
| 4,476,012 A | 10/1984 | Gatsis | |
| 4,551,224 A | 11/1985 | Kuhlmann | |
| 4,610,776 A | 9/1986 | Urban et al. | |
| 4,617,105 A | 10/1986 | Miller | |
| 4,671,801 A | 6/1987 | Burgess et al. | |
| 4,762,527 A | 8/1988 | Beshore et al. | |
| 4,959,139 A | 9/1990 | Blakeburn, II et al. | |
| 4,997,548 A | 3/1991 | Rantell et al. | |
| 5,061,363 A | 10/1991 | Farcasiu et al. | |
| 5,182,011 A | 1/1993 | Tsuchitani et al. | |
| 5,208,003 A | 5/1993 | Simandl et al. | |
| 5,248,413 A * | 9/1993 | Stencel et al. | 208/400 |
| 5,262,043 A | 11/1993 | Boenigk et al. | |
| 5,300,272 A | 4/1994 | Simandl et al. | |
| 5,746,906 A | 5/1998 | McHenry et al. | |
| 5,868,974 A | 2/1999 | Kearns | |
| 5,888,469 A | 3/1999 | Stiller et al. | |
| 5,955,375 A | 9/1999 | Zondlo et al. | |
| 5,961,814 A | 10/1999 | Kearns | |
| 6,129,773 A | 10/2000 | Killick et al. | |
| 6,241,957 B1 | 6/2001 | Stiller et al. | |
| 6,287,375 B1 | 9/2001 | Klett | |
| 6,344,159 B1 | 2/2002 | Klett | |
| 6,387,343 B1 | 5/2002 | Klett | |
| 6,399,149 B1 | 6/2002 | Klett et al. | |
| 6,506,354 B1 | 1/2003 | Stiller et al. | |
| 6,544,491 B1 | 4/2003 | Stiller et al. | |
| 6,576,168 B2 | 6/2003 | Hardcastle et al. | |
| 6,656,443 B2 | 12/2003 | Klett | |
| 6,663,842 B2 | 12/2003 | Klett | |
| 6,689,336 B2 | 2/2004 | Kanno et al. | |
| 6,712,866 B2 | 3/2004 | Paul | |
| 6,797,251 B1 | 9/2004 | Bennett et al. | |
| 6,833,012 B2 | 12/2004 | Rogers | |
| 6,860,910 B2 | 3/2005 | Rogers et al. | |
| 6,869,455 B2 | 3/2005 | Rogers et al. | |
| 7,014,668 B2 | 3/2006 | Golubkov et al. | |
| 7,070,755 B2 | 7/2006 | Klett et al. | |
| 8,101,812 B2 | 1/2012 | Fan et al. | |
| 8,226,816 B2 | 7/2012 | Kennel et al. | |
| 2005/0097814 A1 | 5/2005 | Sugita et al. | |
| 2007/0144944 A1 | 6/2007 | Del Bianco et al. | |
| 2008/0072476 A1 | 3/2008 | Kennel et al. | |
| 2009/0250381 A1 | 10/2009 | Fan et al. | |
| 2011/0230688 A1 | 9/2011 | Chardon et al. | |

OTHER PUBLICATIONS

Fernández et al., "Modificaton of Coal-Tar Pitch by Air-Blowing I. Variaton of Pitch Composition and Properties," Carbon, 1995, pp. 295-307, vol. 33, No. 3, Elsevier Science Ltd., Great Britain.

Taylor et al., "Future Synthetic Fuels: A Scientific and Technical Applications Forecast—1975," Sep. 1975, US Army Contract DAA05-73-C-0559.

"Increased Automobile Fuel Efficiency and Synthetic Fuels: Alternatives for Reducing Oil Imports," NTIS Order No. PB83-126094, 1982, 157 pages.

Stansberry et al., "Development of binder pitches from coal extract and coal-tar pitch blends," 2001, pp. 581-585, Light Metals.

"The Carbon Products Industry Vision for the Future", Sep. 1998, pp. i-vii; 1-27, Carbon Products Consortium.

Wombles, Robert H., "Experience with Petroleum Enhanced Coal Tar Pitch", 2000, pp. 1-11, http://www.koppers.com/htm/PandS_RanD_WhiteP.html.

Elliott, J.D., "Fine-Tune Your Delayed Coker: Obstacles and Objectives", Sep. 2004 issue, pp. 83-90, www.HydrocarbonProcessing.com.

"Tar and Pitch", pp. 1-31, Kirk-Othmer Encyclopedia of Chemical Technology.

J. J. Fernandez et al., "Modification of Coal-Tar Pitch by Air-Blowing—I. Variation of Pitch Composition and Properties", Pergamon, Carbon, vol. 33, No. 3, pp. 295-307.

* cited by examiner

HYDROGENATED VEGETABLE OIL IN COAL LIQUEFACTION

CROSS REFERENCE TO RELATED APPLICATION

This application claims the benefit of the following provisional applications, each of which is hereby incorporated by reference in its entirety:

U.S. Provisional Application No. 61/357,323, filed Jun. 22, 2010; and U.S. Provisional Application No. 61/357,332, filed Jun. 22, 2010.

This application is a continuation-in-part of the following U.S. patent applications, each of which is incorporated by reference in its entirety:

U.S. Non-Provisional application Ser. No. 11/897,059, filed Aug. 29, 2007; and U.S. Non-Provisional application Ser. No. 11/805,737, filed May 24, 2007.

This application is a continuation of the following U.S. patent applications, each of which is incorporated by reference in its entirety:

U.S. Non-Provisional application Ser. No. 13/165,857, filed Jun. 22, 2011.

BACKGROUND OF THE INVENTION

1. Field of the Invention

The present invention relates to coal-to-liquid technology, and specifically to a system and method for liquefying coal using solvents that hydrogenate under mild conditions.

2. Description of Related Art

Coal-to-liquid technology refers to chemical processes that convert solid coal into liquid fuels and chemicals. The hydrogen to carbon ratio (H/C, molar) of coal is about 0.8 while that of liquid fuels is about 2.0. The main functions of the coal-to-liquid processes are breakage of the coal's molecular size and addition of hydrogen into coal, or in other words, destructive hydrogenation of coal. These processes are generally termed as coal liquefaction.

Coal liquefaction may occur by two different pathways: indirect liquefaction and direct liquefaction. The indirect method converts coal to hydrogen and carbon monoxide, and syngas by reacting coal with steam at high temperatures in an oxygen-starved combustion process. Direct liquefaction includes reaction of coal with hydrogen in a manner that coal becomes liquid. However, direct coal liquefaction has been historically carried out with hydrogen gas, which requires high temperature and pressure. In an example, direct coal liquefaction may involve temperatures in excess of 450° C. and 2000 psig pressure.

Tetralin has been used as a donor solvent. However, a large overpressure of hydrogen and high temperature is needed to transfer the hydrogen from the gas phase to naphthalene, which is produced when tetralin is dehydrogenated as it transfers hydrogen to coal molecules. Thus, in situ re-hydrogenation during liquefaction can be rather costly.

In view of the limitations discussed above, there exists a need for a method of coal liquefaction utilizing an inexpensively produced, effective hydrogen donor solvent to digest coal.

SUMMARY OF THE INVENTION

In an aspect, the present invention provides methods and systems for inexpensively producing an effective solvent to digest coal. Alternatively, the methods and systems may enhance the dissolution ability of heavy aromatic oils by the addition of a hydrogenated liquid. In an embodiment, the hydrogenated liquid may be partially or fully hydrogenated vegetable oil. The present invention may also provide a process that may liquefy coal without the need to hydrogenate the solvent. In embodiments, this may occur by the use of an additive that may contain hydrogen, which may result in de-polymerizing large coal molecules, while also suppressing recombination; thus, resulting in smaller overall molecular distribution and creating a liquid.

In an aspect, a method of obtaining a de-ashed coal extract includes exposing a coal to a hydrogenated vegetable oil in the presence of a coal-derived solvent to form a slurry, elevating the temperature of the slurry to facilitate liquefying the coal and liberating a volatile matter, and separating the insoluble components from the slurry to obtain a de-ashed coal extract, wherein the coal extract is suitable for downstream processing. Water liberated as a result of the elevated temperature may be captured and stored. Volatile matter may be condensed and recycled. The method may further include distilling the coal extract to obtain a pitch. The coal-derived solvent may be selected from a group comprising recycled liquefied coal, coal tar distillate, and coal tar pitch. The hydrogenated vegetable oil may have a vapor pressure of less than 1500 psi at temperatures less than 400 degrees Celsius. Separating may include at least one of centrifugation, filtration, decanting, and float separation. The hydrogenated vegetable oil may be at least one of soybean oil, peanut oil, canola oil, olive oil, other vegetable oil or combination of at least two of these oils. The temperature may be elevated to between 300 degrees Celsius and 600 degrees Celsius. The method may further include agitating the slurry to facilitate liquefying the coal. The coal may be selected from one or more of a sub-bituminous coal, lignite coal and an anthracite coal. The method may further include heating the insoluble components to liberate a volatile matter and an entrained solvent, blending the insoluble components with a calcareous material and roasting the blend in a kiln at a temperature greater than 1000 degrees Celsius to obtain a clinker, and grinding the clinker to obtain a cement. The method may further include distilling the coal extract under vacuum to obtain a mesophase pitch with a softening point in the range of 25 degrees Celsius to 160 degrees Celsius, wherein the mesophase pitch can be coked to obtain an anisotropic coke. The method may further include coking the pitch to obtain a coke. The coke may be at least one of an anisotropic coke, a metallurgical coke, a graphite coke, an anode coke, and a needle coke. The method may further include air blowing the pitch to crosslink molecules in the pitch, the air blowing of synthetic pitch used for at least modifying a softening point and increasing coke yield.

In an aspect, a method of obtaining a de-ashed coal extract may include exposing a coal to a petroleum crude to form a slurry, elevating the temperature of the slurry to facilitate liquefying the coal and liberating a volatile matter, and separating the insoluble components from the slurry to obtain a de-ashed coal extract, wherein the coal extract is suitable for downstream processing. Petroleum crude may be at least one of crude bitumen, oil sands crude and liquids containing at least 20% of oil sands crude. The de-ashed coal extract may be added to a pipeline of petroleum crude for delivery to a petroleum refinery.

In an aspect, a method of obtaining a de-ashed coal extract may include exposing a coal to a rubber material in the presence of a coal-derived solvent to form a slurry, elevating the temperature of the slurry to facilitate liquefying the coal and liberating a volatile matter, and separating the insoluble components from the slurry to obtain a de-ashed coal extract, wherein the coal extract is suitable for downstream processing. The rubber material may be from a rubber tire.

In an aspect, a method of obtaining a de-ashed coal extract may include exposing a coal to a sewage material in the presence of a coal-derived solvent to form a slurry, elevating the temperature of the slurry to facilitate liquefying the coal and liberating a volatile matter, and separating the insoluble components from the slurry to obtain a de-ashed coal extract, wherein the coal extract is suitable for downstream processing.

In an aspect, a method of obtaining a cement by-product of coal liquefaction may include exposing a coal to a hydrogenated vegetable oil in the presence of a coal-derived solvent to form a slurry, elevating the temperature of the slurry to facilitate liquefying the coal and liberating a volatile matter, separating the insoluble components from the slurry, heating the insoluble components to liberate a volatile matter and an entrained solvent, blending the insoluble components with a calcareous material and roasting the blend in a kiln at a temperature greater than 1000 degrees Celsius to obtain a clinker, and grinding the clinker to obtain a cement.

In an aspect, a method of obtaining a quinolone insoluble-free and ash-free mesophase pitch may include exposing a coal to a hydrogenated vegetable oil in the presence of a coal-derived solvent to form a slurry, elevating the temperature of the slurry to facilitate liquefying the coal and liberating a volatile matter, separating the insoluble components from the slurry to obtain a de-ashed coal extract that is quinoline insoluble-free, and distilling the coal extract under vacuum to obtain a mesophase pitch with a softening point in the range of 25 degrees Celsius to 160 degrees Celsius, wherein the mesophase pitch can be coked to obtain an anisotropic coke. A quinolone insoluble-free and ash-free pitch may be obtained by the method.

In an aspect, a method of obtaining a high quality coke from a low rank coal extract may include exposing a coal to a hydrogenated vegetable oil in the presence of a coal-derived solvent to form a slurry, elevating the temperature of the slurry to facilitate liquefying the coal and liberating a volatile matter, separating the insoluble components from the slurry to obtain a de-ashed coal extract that is quinoline insoluble-free, distilling the coal extract under vacuum to obtain a pitch with a suitable softening point, and coking the pitch to obtain a coke. The coke may be at least one of an anisotropic coke, a metallurgical coke, a graphite coke, an anode coke, and a needle coke. The method may further include air blowing the pitch to crosslink molecules in the pitch, the air blowing of synthetic pitch used for at least modifying a softening point and increasing coke yield.

In an aspect, an apparatus for coking includes a coated coking drum that receives a pitch material, wherein the coking drum is coated with a coating comprising at least one of a chromium, an aluminum, a nickel, or an alloy thereof, a heater that heats the pitch material to a coking temperature, and a flash vessel that condenses a liberated volatile matter, wherein a coke formed in the apparatus is readily removable.

In another aspect, an apparatus for coking includes a coated coking drum that receives a pitch material, wherein the coking drum is coated with a coating comprising at least one of a chromium, an aluminum, a nickel, or an alloy thereof, a heater that heats the pitch material to a coking temperature, a flash vessel that condenses liberated volatile matter, and a coated Archimedes screw, wherein the Archimedes screw is coated with a coating comprising at least one of a chromium, an aluminum, a nickel, or an alloy thereof, wherein the Archimedes screw pushes the pitch through the coking drum as it is being coked, and a coke formed in the apparatus is removed by the force of the Archimedes spiral.

In yet another aspect, an apparatus for coking may include a coated coking drum that receives a pitch material, wherein the coking drum is coated with a coating comprising at least one of a chromium, an aluminum, a nickel, or an alloy thereof, a heater that heats the pitch material to a coking temperature, a flash vessel that condenses liberated volatile matter, and a coated plunger, wherein the plunger is coated with a coating comprising at least one of a chromium, an aluminum, a nickel, or an alloy thereof wherein a coke formed in the apparatus is removed by the force of the plunger being pushed or pulled through the coking drum.

In an aspect, a modular coal liquefaction system may include a reactor for exposing a coal to a hydrogenated vegetable oil in the presence of a coal-derived solvent to form a slurry, a heater that elevates the temperature of the slurry in the reactor to facilitate liquefying the coal and liberating a volatile matter, and a centrifuge that separates the insoluble components from the slurry to obtain a de-ashed coal extract, wherein the coal extract is suitable for downstream processing, wherein the reactor, heater, and centrifuge are adapted to be modular. The system may further include a distillation column that distills the de-ashed coal extract to obtain a pitch. The system may further include a coker that cokes at least one of the de-ashed coal extract and the pitch to obtain a coke. The system may be adapted to be modularly disposed on a rail car. The system may be adapted to be modularly disposed on a semi-truck trailer.

In another aspect, a modular coal liquefaction system may include a reactor for exposing a coal to a hydrogenated vegetable oil in the presence of a coal-derived solvent to form a slurry, a heater that elevates the temperature of the slurry in the reactor to facilitate liquefying the coal and liberating a volatile matter, a centrifuge that separates the insoluble components from the slurry to obtain a de-ashed coal extract, wherein the coal extract is suitable for downstream processing, a distillation column that distills the de-ashed coal extract to obtain a pitch, and a coker that cokes at least one of the de-ashed coal extract and the pitch to obtain a coke, wherein the coker comprises a coated coking drum that receives the de-ashed coal extract or the pitch, wherein the coking drum is coated with a coating comprising at least one of a chromium, an aluminum, a nickel, or an alloy thereof, wherein the reactor, heater, centrifuge, distillation column, and coker are adapted to be modular. The system may be adapted to be modularly disposed on a rail car. The system may be adapted to be modularly disposed on a semi-truck trailer.

In an aspect, a coal liquefaction system includes a reactor for exposing a coal, to a hydrogenated vegetable oil in the presence of a coal-derived solvent to form a slurry, a heater that elevates the temperature of the slurry in the reactor to facilitate liquefying the coal and liberating a volatile matter, and a centrifuge that separates the insoluble components from the slurry to obtain a de-ashed coal extract, wherein the coal extract is suitable for downstream processing. The system may further include a distillation column that distills the de-ashed coal extract to obtain a pitch. The system may further include a coker that cokes at least one of the de-ashed coal extract and the pitch to obtain a coke. The coker includes a coated coking drum that receives the de-ashed coal extract or the pitch, wherein the coking drum is coated with a coating comprising at least one of a chromium, an aluminum, a nickel, or an alloy thereof. The system may be adapted to be modular. The system may be adapted to be modularly disposed on a rail car. The system may be adapted to be modularly disposed on a semi-truck trailer.

In an aspect, a coal liquefaction system includes a reactor for exposing a coal to a hydrogenated vegetable oil in the presence of a coal-derived solvent to form a slurry, a heater that elevates the temperature of the slurry in the reactor to facilitate liquefying the coal and liberating a volatile matter, a centrifuge that separates the insoluble components from the slurry to obtain a de-ashed coal extract, wherein the coal extract is suitable for downstream processing, a distillation column that distills the de-ashed coal extract to obtain a pitch, and a coker that cokes at least one of the de-ashed coal extract and the pitch to obtain a coke, wherein the coker comprises a coated coking drum that receives the de-ashed coal extract or the pitch, wherein the coking drum is coated with a coating comprising at least one of a chromium, an aluminum, a nickel, or an alloy thereof.

In another aspect of the invention, the methods and systems may produce a slurry of coal liquids and undissolved coal particles. The slurry may be further refined to produce a pitch, which may be considered a final product or alternatively may be upgraded to produce lighter hydrocarbon synthetic crude for fuels and chemicals. The present invention may also seek to remove sulfur from sulfur-containing hydrocarbon liquids such as crude petroleum.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE DRAWINGS

The invention and the following detailed description of certain embodiments thereof may be understood with reference to the following figures.

Figure 1:
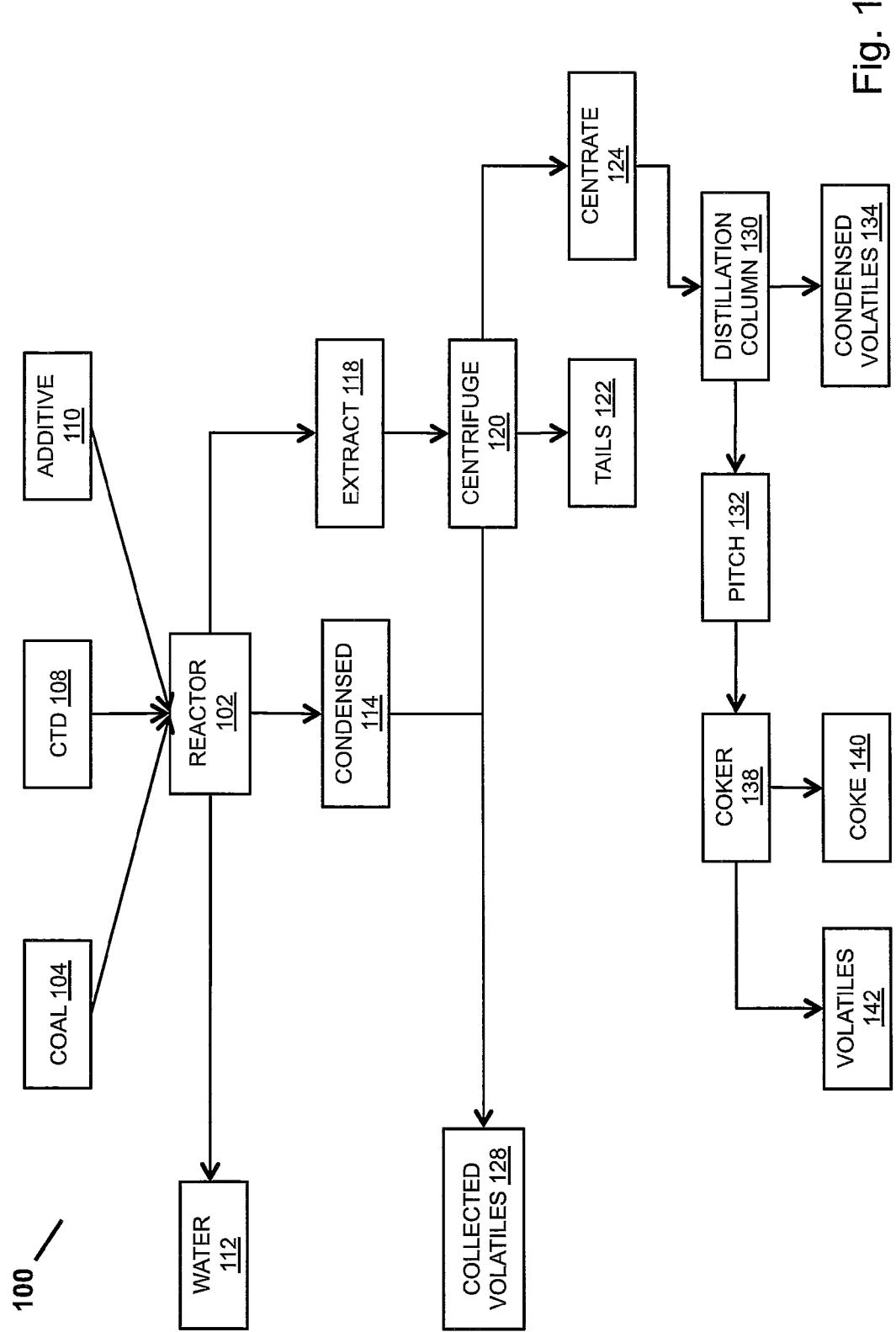
FIG. 1 illustrates an overview of a system for carrying out a coal liquefaction process, in accordance with an embodiment of the present invention.

Those of ordinary skill in the art will appreciate that the elements in the figures are illustrated for simplicity and clarity and are not necessarily drawn to scale. For example, the dimensions of some of the elements in the figures may be exaggerated, relative to other elements, in order to improve an understanding of the present invention.

DESCRIPTION OF THE PREFERRED EMBODIMENTS

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather to provide an understandable description of the invention.

The terms "a" or "an," as used herein, are defined as one or more than one. The term "another," as used herein, is defined as at least a second or more. The terms "including" and/or "having", as used herein, are defined as comprising (i.e., open transition).

The present invention relates to coal solvents and more specifically to a method for inexpensively producing an effective partially or fully hydrogenated solvent to digest coal, thereby producing a slurry of coal liquids and undissolved coal particles. In an embodiment, the present invention may include three phases. The first phase may include formation of a coal slurry and that may be treated in a reactor and may then be centrifuged to obtain a centrate. The second phase may include distillation of the centrate produced in the first phase. The distillation may result in formation of pitch that may be introduced to a coker in the third phase. In this phase, the pitch may be coked to obtain coke with different properties.

The present disclosure describes a process for coal liquefaction that involves the mixing of ground coal, a coal tar distillate that has been purchased from a coke oven operator or distributor or collected from prior runs of the process, and a hydrogen donor solvent to form a slurry. Most coal liquefaction was done previously with bituminous coal, but in contrast, the present disclosure describes the advantageous use of sub-bituminous and lignite coals and other low rank coals not previously considered suitable for liquefaction. It should be understood that the process described herein may be employed with any kind of coal. Coal liquefaction has previously been carried out with hydrogen gas, requiring high temperature and pressure, commonly at 450 C and 2000 psig pressure. In the Exxon donor process, hydrogenated naphthalene is used as a proton donor. Naphthalene hydrogenation, and in situ re-hydrogenation, requires high temperatures and high pressures. The present disclosure describes the unexpected liquefaction results obtained using hydrogenated vegetable oil or partially hydrogenated vegetable oil in combination with a coal tar distillate (CTD). Liquefaction can proceed without high temperature or applied pressure that is usually required for liquefaction, however, any level of temperature and pressure may be employed in the process. Also, it is relatively easy and inexpensive to hydrogenate vegetable oil. Coal also liquefies without high temperature or pressure in pipeline crude oil, since pipeline crude has excess hydrogen. Coal also liquefies in CTD mixed with ground up rubber tires as the H-donor, lignin-containing sewage sludge, and other hydrogen donor solvents further described herein.

The slurry is heated at ambient pressure in a reactor to drive off water. At this stage in the process, the temperature may only be raised high enough to boil off water. Water is flashed off when the pressure builds up in the reactor and can optionally be collected and stored. Many cycles may be needed to remove substantially all of the water. Alternatively, the coal may first be dried. After a few cycles of water evaporation, the reactor is brought up to temperature for the thermal breakdown of the coal molecules. The fracturing of the large coal molecules commonly occurs through the formation of radicals. As radicals form, the hydrogen donor solvents donate a hydrogen to stabilize the radical, thus stabilizing the liquid form. As aromatic sites get saturated, the coal liquid becomes more and more aliphatic. While the hydrogen donor solvent may be involved in stabilization of thermally generated radicals, it may also be involved in bond cleavage. Thus, the process may actually be improved by having only partially hydrogenated solvents because once all of the radical sites are filled, they will not be re-cleaved. The process liberates volatiles, which can be fed back into the process as "CTD starting material". There are changes that occur in the chemical composition of the recycled CTD. More dissolved coal molecules replace some of the original molecules so the solvent becomes more compatible with the dissolving coal as the CTD is being reused. Indeed, any volatiles liberated throughout the process may be recovered and recycled as starting material.

The resultant coal extract is centrifuged, or otherwise subjected to a separation process, to de-ash it. The solid ash, or tails, can be recovered from the centrifuge and processed to eventually obtain a cement, which will be further described below. The centrate is collected and can immediately be subjected to petroleum-type refining processes to obtain fuels. Alternatively, it can be distilled. Partial distillation results in a heavy crude-like substance, which can be further refined using petroleum-type refining processes. Further distillation results in pitch similar to coal tar binder pitch, but without the quinoline insoluble matter. Annealing at this distillation step alters the properties of the resultant pitch. Pitch can be further processed in a coker, such as a delayed coker. Optionally, the pitch can be air blown to obtain coke with different properties.

In some embodiments, the coker may be coated with chrome, nickel, aluminum or alloys thereof to facilitate removal of the coke. The plunger or worm gear of the coker may also be similarly coated to facilitate coke removal. The coated coker is smaller than other commercially available cokers, thus, CTL processes/plants with coke as the end product may be miniaturized or mobilized. Carbon materials such as coke stick to steel. It is difficult to separate coke from steel; however, coke does not stick to chrome or chrome alloys therefore coating steel with chrome or chrome alloys permits separation of coke from the surface.

FIG. 1 illustrates a system 100 for carrying out a coal liquefaction process. The system 100 may include a coal liquefaction reactor 102 (hereinafter referred to as reactor 102). The reactor 102 may be a closed reactor. In an embodiment, the reactor 102 may be run in a continuous mode, i.e., reactants may be continuously fed into the reactor 102 and may emerge as a continuous stream of products. Further, the reactor 102 may be run in a batch mode for carrying out a sequence of different operations such as solids dissolution, product mixing, batch distillation, and the like. In an embodiment, the reactor 102 may be configured with alkali columns for mitigating odor. For example, the reactor 102 may be provided with sodium hydroxide (NaOH) columns for absorbing the odor.

Further, the reactor 102 may enable mixing various reactants such as coal 104, a CTD 108, and an additive 110 to form a slurry in which reactive dissolution of the coal 104 occurs to yield a coal extract. After liquefaction, the coal extract may be de-ashed. In an embodiment, the coal extract may be de-ashed by employing a separation process, such as centrifugation, float separation, decanting, filtration, and the like, to separate the extract into a heavy phase containing the insoluble coal products and a light phase (hereinafter referred as centrate) containing the soluble coal products. The centrate may be refined using typical petroleum refining processes to yield transportation fuels. Alternatively, the centrate may be distilled to yield a pitch that can be coked to yield high value coke products. The pitch may also be refined using typical petroleum refining processes to yield transportation fuels.

In an embodiment, the coal 104 may be a low rank coal such as sub-bituminous coal. Further, the low-rank coal products may be rich in hydrogen, possess higher oil to asphaltene ratios, and may be more aliphatic than the bituminous coal liquids. The present invention may enable generation of high quality coke from low rank coals; however, it will be evident to a person skilled in the art that the coal 104 may be bituminous, lignite, and the like.

In an embodiment, the coal 104 may be crushed to −20 mesh (800 microns) or smaller before combining the coal 104 with other reactants. Further, the CTD 108 may be obtained from a petroleum refinery, a coal tar refinery, purchased from a coke oven operator or distributor, or the like. Alternatively, the CTD 108 may be collected from prior cycles of the liquefaction processing in the system 100. In an embodiment, the additive 110 may be a hydrogen donor solvent (H donor solvent). In embodiments, the H donor solvent may be alternatively referred as a proton transfer agent.

In an embodiment, the additive 110 may be a partially or fully hydrogenated vegetable oil (hereinafter alternatively referred to as HVO). The HVO may include, but is not limited to, corn, canola, sunflower, safflower, and olive. Since vegetable oils may be easily hydrogenated, they may be preferred as the H donor solvent for use in the system 100. In an embodiment, the partially hydrogenated vegetable oil may include one part of hydrogenated vegetable oil mixed with one part of non-hydrogenated vegetable oil, or any other ratio thereof. Vegetable oils may be hydrogenated to a level of up to ten percent hydrogen by weight using lower pressure, lower temperature and shorter residence time than hydrogensation of other solvents, such as naphthalene. For example, soybean oil can be hydrogenated at a pressure of less than 200 psi, at a temperature less than 200° C., and a residence time of 10 minutes or less. Hence, this process requires less processing energy, since generation of high temperature and pressure is energy-intensive. Moreover, hydrogenated vegetable oils are known for their overall economy and high boiling point, making them suitable for use in processes to dissolve coal.

In embodiments, a plurality of hydrogenated solvents may be used for the coal liquefaction process. The hydrogenated solvents may include, but are not limited to, pipeline crude oil, rubber tires, animal waste, anything with the potential of adding a proton to an aromatic or breaking a chemical bond, horse manure, chicken manure, sewage sludge, lignin, any bio-waste with lignin, peanut oil, soybean oil, canola oil, olive oil or other vegetable oil, decalin, partially hydrogenated coal tar distillate, or partially hydrogenated petroleum distillate or partially hydrogenated decant oil or recycle oil, Fisher-Tropsch liquid, methyl naphthalene, decahydronaphthalene, tetrahydronaphthalene, methyl naphthalene, creosote oil, coal tar pitch, asphalt pitch, gasification tar, recycled motor oil, petroleum distillates, rubber, plastics, recycled plastics (e.g. polystyrenes), recycled rubber, biomass derivatives, liquefied coal, liquefied biomass, shale oil, liquefied process gas, cacenaphthenes, di, tetra- and octahydroanthracenes, tetrahydroacenaphthenes and other derivatives of partially hydrogenated aromatic compounds, petroleum distillates, petroleum catalytic cracker products, distillates of gasification tars, products from the pyrolysis of recycled hydrocarbons, and aromatic oil products obtained from the distillation of shale oil or tar sands.

As mentioned herein, rubber tires may be used as an H donor solvent. The rubber tires may include about 40% carbon black by weight. When coal is dissolved using these rubber tires, this carbon black may become quinoline insoluble and, therefore, the pitch obtained may be tuned to commercially used pitches from coke ovens.

In an embodiment, lignin may be used as an H donor solvent. Lignin is an undigested, propylbenzene polymer found in mammal waste. Hydrogen lost due to splitting of the polymer may be used as a hydrogen source. In an example, when bacteria consume oxygen containing compounds from tertiary sewage sludge, the sludge is left with lignin. Thus, tertiary sewage sludge may be used in the coal liquefaction process.

In an embodiment, a blend of hydrogenated and non-hydrogenated solvents may result in an improved yield. For example, during coal liquefaction, once a coal molecule breaks down into smaller pieces, proton transfer may take place. The smaller pieces of the coal molecule may get hydrogenated and may tend to become non-polar. Accordingly, the non-polar coal molecules may get dissolved in the non-protonated form of the solvent.

In embodiments, the coal liquefaction process may proceed at a lower pressure than is usually required for coal liquefaction e.g., 400 psig. In an embodiment of the present invention, the HVO may enable the coal liquefaction process to be run at lower temperature and lower pressure with less hydrogen. In a scenario, the coal liquefaction process may enable hydrogenation through the proton transfer agent at milder conditions when compared with the conditions of conventional proton transfer agents. For example, the coal liquefaction process may require less extreme conditions to transfer hydrogen to vegetable oils as compared to transfer of hydrogen to naphthalene. Consequently, it may be easier to remove hydrogen from HVO and therefore, it may serve as a better transfer agent than tetralin, for example.

In an example, hydrogenation of naphthalene may require high temperature (more than 300° C.) and high pressure (1000 psi or more). Further, the hydrogenation of naphthalene may require a long residence time (more than 10 minutes). However, soybean oil may be hydrogenated at a pressure of less than 200 psi, at a temperature less than 200° C., and a residence time of 10 minutes or less. Hence, this process may require less processing energy as generation of high temperature and pressure may be energy-intensive. Further, hydrogenated vegetable oils have high boiling points, thereby making them suitable for use in processes to dissolve coal. In an embodiment, the hydrogenation of solvents for the liquefaction process may be achieved and/or enhanced at low temperature and pressure by introducing hydrotreating catalysts such as cobalt-molybdenum catalyst, nickel-molybdenum catalyst, and the like.

The mass ratio of coal to total solvents may be about 1:2.5, 1:2, or the like. In an embodiment, the mass ratio may be greater. The slurry as mentioned herein may be heated at an ambient pressure in the reactor 102 to drive off water. At this stage in the process, the temperature may only be raised high enough to boil off water. Many cycles of the process may be required for completely removing the water. In an alternative embodiment, the coal 104 may be dried first. After a few cycles of water evaporation, the reactor 102 may be brought up to a temperature for liquefaction. The thermal rupture of coal molecules may result in the production of unstable free radicals. In an embodiment, the proton transfer agent may prevent re-polymerization in the coal liquefaction process. The free radicals, as mentioned herein, may react with hydrogen donated by the H donor solvent present in the process to form stable species. In some embodiments, the H donor solvent may be capable of engendering bond scission. Thus, the process may be improved by having only partially hydrogenated solvents, i.e., one part of the molecules in solution may be hydrogenated while the others are not.

Therefore, once all the radical sites are filled, they may not be re-cleaved. The process may liberate volatiles, which may be fed (recycled) into the process as a CTD starting material. In an embodiment, there may be changes that may occur in the chemical composition of the recycled CTD. As more dissolved coal molecules replace some of the original molecules, the recycle solvent may become more compatible with the dissolving coal. In an embodiment, any volatile liberated throughout the process may be recovered and recycled as the starting material. Further, the proton transfer agent, such as the HVO, may saturate aromatic site and may render the resultant liquid more aliphatic.

In an embodiment, pipeline crude oil may be used as the additive 110 in the coal liquefaction process. Accordingly, the pipeline crude oil may act as a solvent as well as a proton transfer agent, and in some embodiments, a hydrogenation agent may be added to the coal liquefaction mixture for enhancing the dissolution of coal in the pipeline crude oil. The hydrogenation agent may facilitate addition of hydrogen molecules to the pipeline crude oil, thereby enabling molecules of the pipeline crude oil to become less polar. The addition of hydrogen molecules may increase solubility of the pipeline crude oil molecules in the coal liquefaction mixture.

After separation of the extract into insoluble material and centrate, the centrate may be added directly into a pipeline of a refinery. In an exemplary embodiment, if properties of the centrate and the pipeline crude oil match or nearly match, the centrate may be added directly back into the pipeline.

In an embodiment, coal 104 may not dissolve in the coal liquefaction mixture, and thereby make the pipeline crude oil less aromatic. In an example, some coals may be more aromatic and may dissolve in an aromatic solvent mixture more readily. For example, based on the aromaticity of the pipeline crude oil, the highly aromatic coal such as bituminous coal may not dissolve in the coal liquefaction mixture. Further, aliphatic coals such as lignite may dissolve well in an aliphatic solvent.

In another embodiment, if the pipeline crude oil is heavily aromatic, a plasticizer may be required to reduce the pipeline crude oil's viscosity. Therefore, the pipeline crude oil may flow with less resistance in the pipeline of the refinery. In a scenario, if the coal dissolved in the mixture is less mature, then it may be expected to produce more aliphatic or smaller and lighter molecules. In such a scenario, the dissolved coal may be distilled and returned to a source of the pipeline crude oil as substitute plasticizers. The distillate may make transportation of heavy pipeline crude oil economic and viable. In an embodiment, two or more feedstock solvents may be blended together for tailoring the properties of the centrate.

Optionally, the coal liquefaction mixture may be agitated using ultrasound. The ultrasound technique may enable the coal 104 to dissolve in the H donor solvent. As mentioned herein, the CTD 108 may be purchased or derived from prior cycles of the liquefaction process. In an example, the CTD 108 may be formed by blending distillates from each step of the liquefaction process.

In an embodiment, the more recycled the CTD 108, the better it functions, as continuous recycling helps components of the CTD 108 reach a steady state. In an embodiment, the composition of the liquefaction mixture may be optimized. The original source of a CTD is coal tar that may be obtained from a coke oven. Coals that are coked are generally bituminous coals. Therefore, the molecules in the CTD are typically from aromatic bituminous coal. In a first example, when this CTD and the bituminous coals are added, molecules may get exchanged between the CTD and the bituminous coals resulting in new CTD that may have the same composition.

In a second example, when the CTD (obtained from bituminous coal) is dissolved in lignite coals, its composition may change as the lignite coals are aliphatic compounds. When the mixture of the lignite coals and the CTD is distilled, the pitch obtained may be rich in bituminous coals and the distillate may be rich in the lignite coals. Accordingly, the recycled CTD may change composition. Therefore, as the recycling of the CTD is repeated, the CTD may get richer in lignite coals. Finally, a steady state may be reached where the CTD may become an efficient solvent for the lignite coals. Thus, recycling of the CTD may change its dissolution properties.

The degree of aromaticity and the size of molecules in the CTD may enable it to be used as a solvent. The CTD 108 may need to have high viscosity for dispersing coal 104 within it. High viscosity of the CTD 108 may not let the coal 104 settle in the coal liquefaction mixture. The middle distillate cut from the coal tars from the coke oven may provide an especially useful CTD.

In an embodiment, a catalyst may be added to the entire process of coal liquefaction. The catalyst may lower the processing temperature or pressure and may also modify properties of the mixture. Examples of the catalyst may include, but are not limited to, salts of iron, molybdenum, tin, and $Fe_2S_3$ optionally with a hydrogen pressure.

In an embodiment, the temperature of the coal liquefaction mixture in the reactor may be raised for condensing or flashing out the water out of the mixture. In an embodiment, this may be done by using a condenser loop. For example, the temperature may be raised to about 150° C. for 200 lbs of the mixture so that water 112 may be removed from the mixture, as the water 112 may become supercritical at higher temperature and may generate pressure that may be too high for the reactor 102. Accordingly, the water 112 may be removed from the mixture before raising the temperature for avoiding high pressure generation in the reactor 102. The water 112 may be removed from the mixture through multiple cycles of raising the temperature and condensing out the water. Further, the water 112 may be recovered.

Once the water has been removed, the temperature of the mixture may be raised to about 425-450° C. in order to facilitate liquefaction. The mixture may be kept at this temperature in the reactor 102 for about 10 minutes to an hour or longer. The coal molecules may break apart at the heteroatomic linkages, and, in embodiments, form radical sites. Further, hydrogen released from the proton transfer agent may react with the mixture and seal off the radical sites of the broken linkages. This may reduce the size of coal molecule clusters and may form a liquid extract. The reaction mixture may be agitated, such as by using a stirrer, an ultrasound technique, or the like.

The solvent extraction need not be performed under a hydrogen atmosphere, however, a hydrogen atmosphere may optionally be used in order to enhance the absorption of hydrogen.

The volatile material may be sent to a flash condenser of the reactor 102 for converting the volatile material into a condensed material 114. The condensed material 114 may be used as a CTD in the coal liquefaction process. Further, the condensed material 114 may be light as compared to the coal extract 118. The coal extract 118 may be sent to a holding tank of the reactor 102 for bringing down the temperature of the coal extract 118 to about 150° C. In an embodiment, the coal extract 118 may be allowed to cool down with time. Alternatively, the coal extract 118 may be cooled down by using a heat transfer loop.

The following example is meant to illustrate an exemplary embodiment of the present disclosure, and is not intended to limit the scope of the embodiments as described herein and as defined in the claims: Experiments were carried out with different solvents to determine whether hydrogenation improved the apparent solubility of coal in each solvent. Solvents tried include carbon black base oil ("CBB", a coal tar distillate obtained from Koppers), anthracene oil ("AO", a coal tar distillate obtained from Reilly Industries), Maraflex® Oil ("MO", a mixture of petroleum distillates obtained from Marathon-Ashland), residual catalytic cracker slurry oil ("SO", obtained from Marathon-Ashland), and tetrahydronaphthalene ("tetralin").

Figure 4:
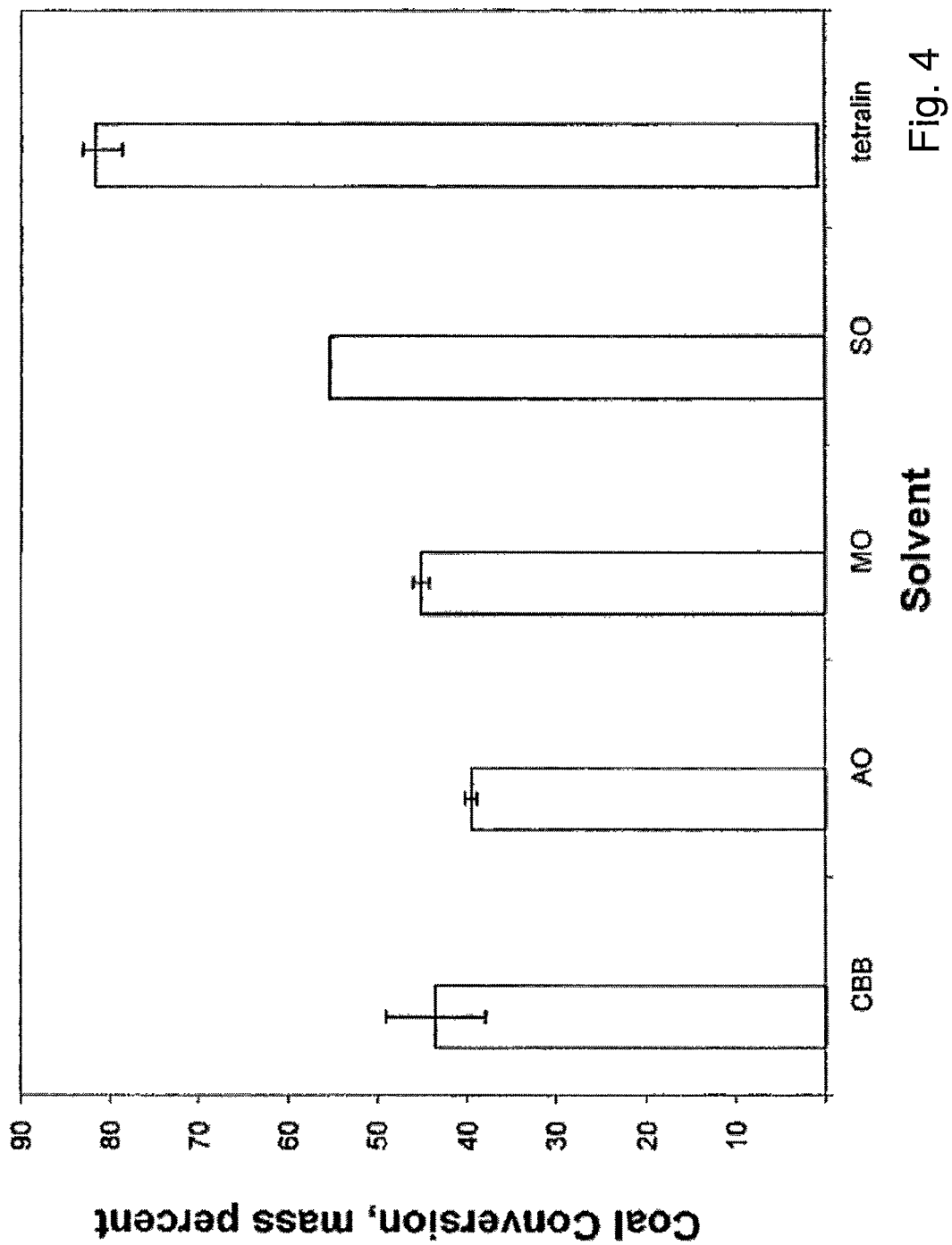
FIG. 4 is a chart depicting an example of coal conversion using various solvents in accordance with one embodiment.

FIG. 4 depicts the coal conversion, in mass percent, obtained using bituminous coal and the above-mentioned solvents. The crushed coal was placed into a sealed container along with the identified solvent at 400° C. for approximately one hour. Pressure within the sealed container was controlled by the vapor pressure of the solvent used. The coal conversion reported in the figure below is simply the fraction of coal mass that was converted from a solid to a liquid phase. These results indicate that tetralin, a known hydrogen donor solvent, is better than the other solvents in terms of coal conversion.

In order to determine whether hydrogenation can enhance the ability to extract coal in the liquid phase, three different hydrogenation conditions were established, as shown in Table 1.

TABLE 1

Solvent Hydrogenation Results

| Run Description | Wt % H2 absorbed | Hydrogenation reactor T, ° C. | Initial Cold H2 Pressure (psig) |
|---|---|---|---|
| CBB Hydrogenation Level 1 | 0.10 | 275 | 500 |
| CBB Hydrogenation Level 2 | 0.14 | 350 | 500 |
| CBB Hydrogenation Level 3 | 0.24 | 375 | 750 |
| Slurry Oil Hydrogenation Level 3 | 0.24 | 375 | 750 |
| Maraflex Oil Hydrogenation Level 3 | 0.24 | 375 | 750 |

Figure 5:
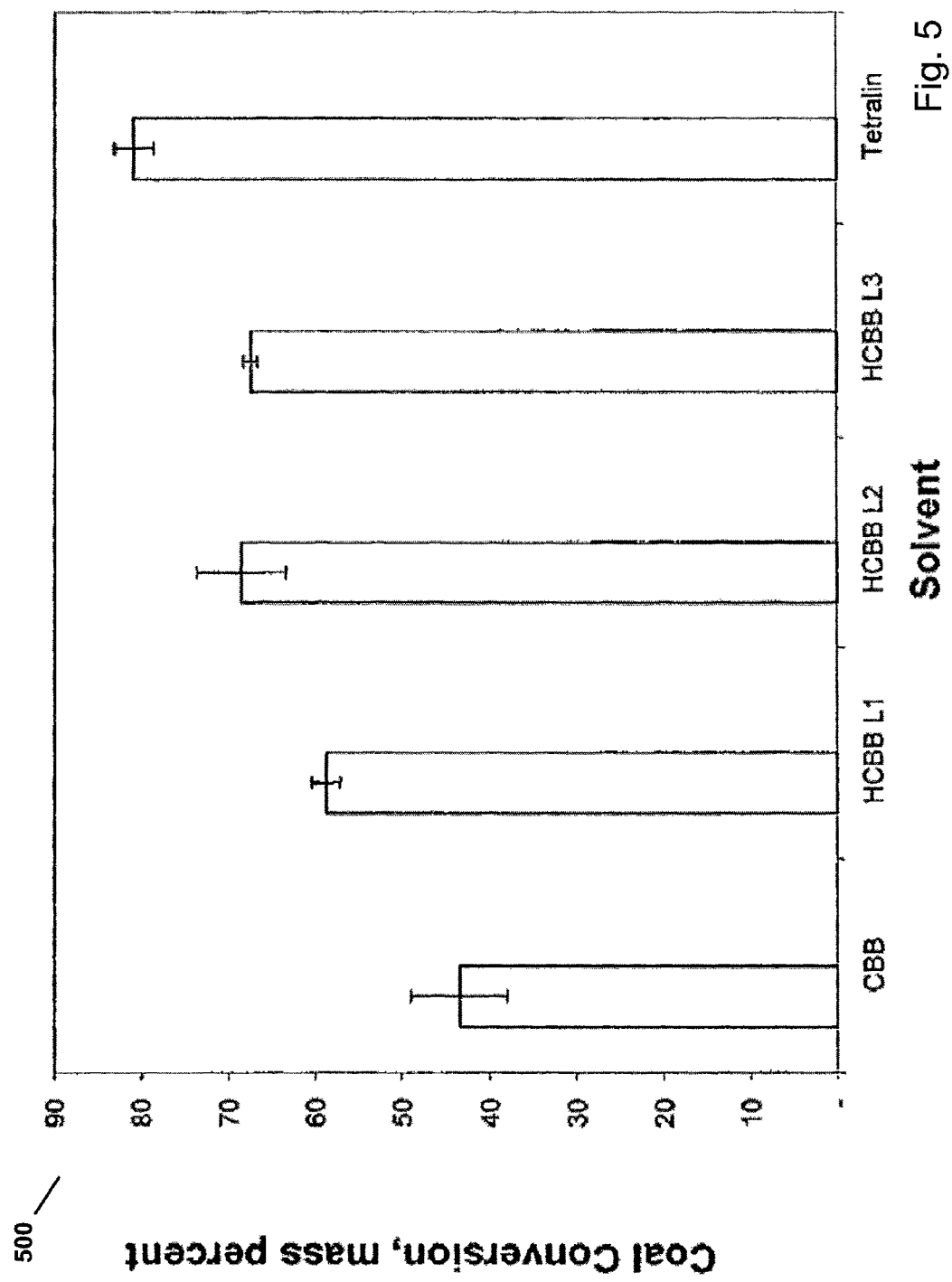
FIG. 5 is a chart depicting an example of the benefits of hydrogenation of the feedstock solvent on coal conversion, in accordance with one embodiment.

Coal extraction using these hydrogenated solvents was performed in the same manner as described previously. As shown in FIG. 5, coal conversion using hydrogenated solvents from coal tar distillates (e.g., carbon black base oil) is significantly improved as compared to the use of non-hydrogenated forms of those same solvents. In fact, the performance was similar to that of tetralin.

Subsequently, experiments with bituminous coal and CBB L3 produced coal conversion of 90% at 425° C. This shows that hydrogenation of hydrocarbon materials can produce an effective alternative to tetralin, a much more expensive solvent that generally cannot be economically incorporated into the pitch product.

In an embodiment, the coal extract may be directed to a separation process via gravity flow. Alternatively, pressure may be applied to the system to drive the extract to the separation process.

Further, the coal extract 118 may be subjected to a separation process to de-ash the coal extract 118, such as centrifugation, filtration, decanting, float separation, or the like. The separation process may separate insoluble material from the extract, such as ash and quinolone-insoluble materials. In an embodiment, the coal extract 118 may be de-ashed by using a centrifuge 120. The centrifuge may be a bowl centrifuge, a scroll decanter centrifuge, or the like. The scroll decanter centrifuge may include a conical rotating member that may strip the solids at a given gravitational force. In the above-mentioned processes, the temperature may need to be kept low such that the viscosity may be less than 100 centipoise. In an embodiment, the extract may have a viscosity below 200 centipoise at an operating temperature of about 140° C. of the centrifuge 120. Preferably, the viscosity may be below 100 centipoise (closer to 40 centipoise) at 200° C. for use in the centrifuge 120. In an embodiment, the centrifuge 120 may include a condenser (not shown) for collecting volatile materials.

The centrifugation process may result in solid ash or tails 122 and centrate 124. The tails 122 may contain about 25-35% volatile materials. These volatile materials may be volatiles from the coal 104 or entrained solvent. Further, the tails 122 may include about 55% ash and about 15% fixed carbon. As a result of the centrifugation, some volatile material may be obtained, this volatile material may be baked and collected (collected volatile 128) and may be added to the recyclable CTD. Baking the tails may produce a solid cake that may include about 85% ash and about 15% fixed carbon. In an embodiment, the ash may be a silicate/aluminate blend.

The solid cake may be mixed with limestone to achieve a 3:1 calcium to silicate/aluminate ratio. This configuration may then be baked in a kiln at about 1400° C. At this temperature, the mixture may burn off the fixed carbon and may produce a clinker. In an embodiment, the clinker may be produced by combining clays in the ash and calcium in the limestone. The clinker may thereafter be ground to make cement.

In another embodiment, the ash may include metals and non-metals that may be separated from the centrate 124 during centrifugation. These separated metals and non-metals may be reacted during clinker formation as insoluble salts of calcium or silicates, and finally may be incorporated into the cements. Accordingly, the present invention may not produce any solid waste after the coal 104 is reacted. Further, the waste material may be used for producing a value-added product.

Figure 10:
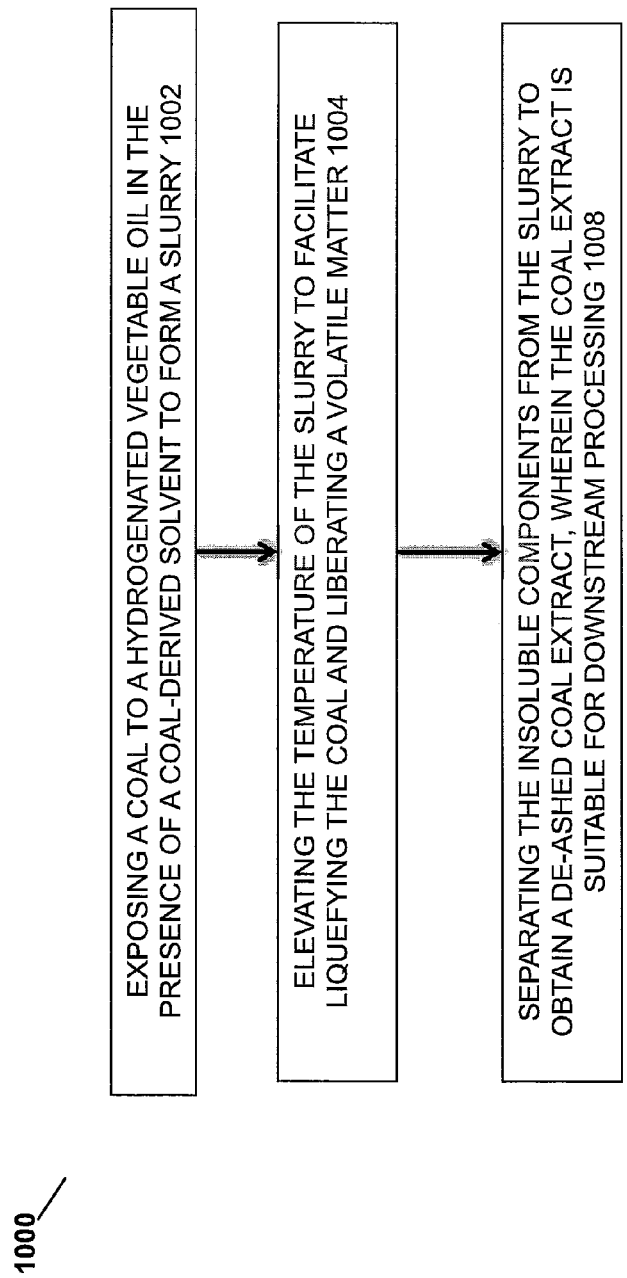
FIG. 10 depicts a method of a coal liquefaction process.

Referring to FIG. 10, a method of obtaining a de-ashed coal extract includes exposing a coal to a hydrogenated vegetable oil in the presence of a coal-derived solvent to form a slurry 1002, elevating the temperature of the slurry to facilitate liquefying the coal and liberating a volatile matter 1004, and separating the insoluble components from the slurry to obtain a de-ashed coal extract, wherein the coal extract is suitable for downstream processing 1008. Water liberated as a result of the elevated temperature may be captured and stored. Volatile matter may be condensed and recycled. The method may further include distilling the coal extract to obtain a pitch. The coal-derived solvent may be selected from a group comprising recycled liquefied coal, coal tar distillate, and coal tar pitch. The hydrogenated vegetable oil may have a vapor pressure of less than 1500 psi at temperatures less than 400 degrees Celsius. Separating may include at least one of centrifugation, filtration, decanting, and float separation. The hydrogenated vegetable oil may be at least one of soybean oil, peanut oil, canola oil, olive oil, other vegetable oil or combination of at least two of these oils. The temperature may be elevated to between 300 degrees Celsius and 600 degrees Celsius. The method may further include agitating the slurry to facilitate liquefying the coal. The coal may be selected from one or more of a sub-bituminous coal, lignite coal and an anthracite coal.

Figure 11:
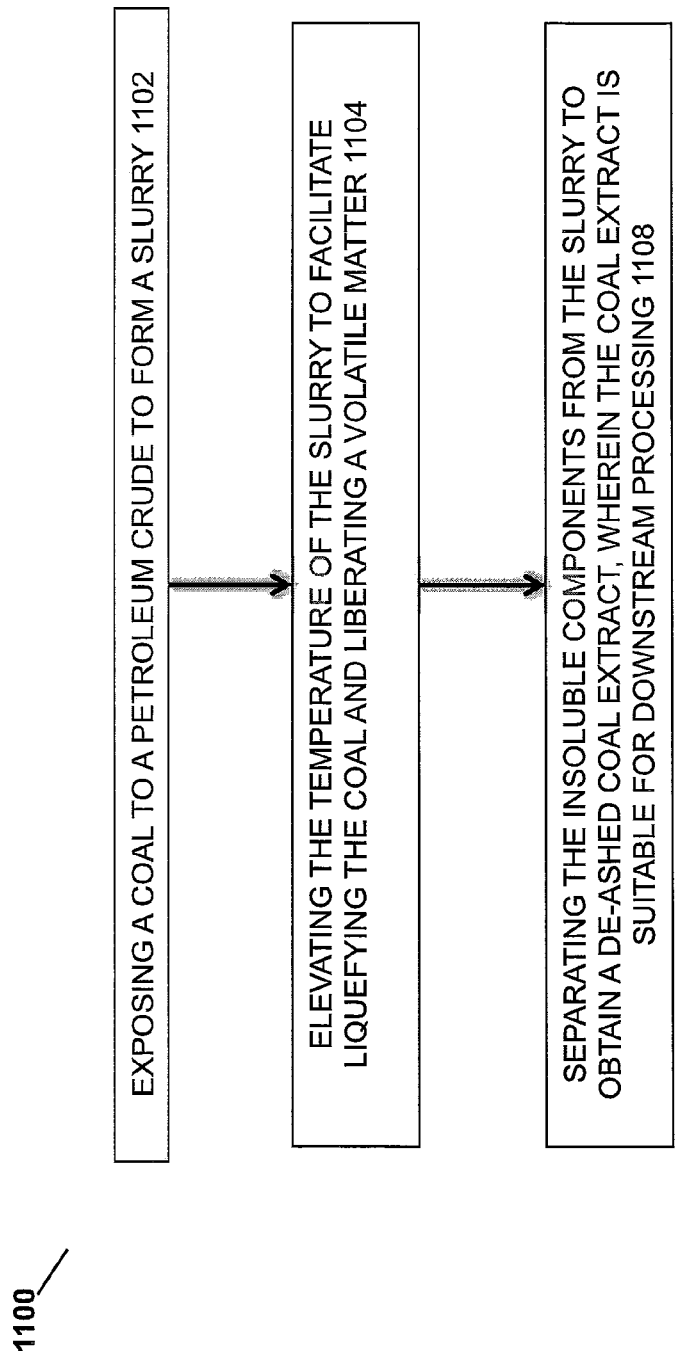
FIG. 11 depicts a method of a coal liquefaction process.

Referring to FIG. 11, a method of obtaining a de-ashed coal extract may include exposing a coal to a petroleum crude to form a slurry 1102, elevating the temperature of the slurry to facilitate liquefying the coal and liberating a volatile matter 1104, and separating the insoluble components from the slurry to obtain a de-ashed coal extract, wherein the coal extract is suitable for downstream processing 1108. Petroleum crude may be at least one of crude bitumen, oil sands crude and liquids containing at least 20% of oil sands crude. The de-ashed coal extract may be added to a pipeline of petroleum crude for delivery to a petroleum refinery.

Figure 12:
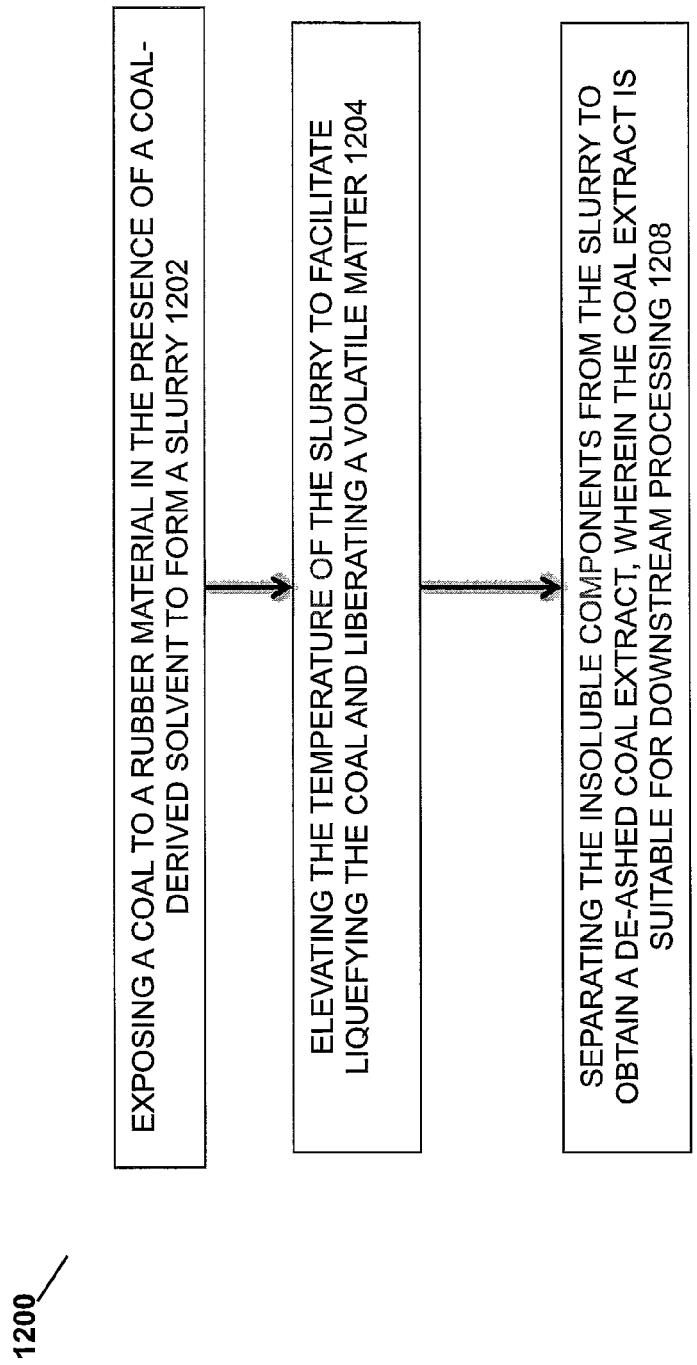
FIG. 12 depicts a method of a coal liquefaction process.

Referring to FIG. 12, a method of obtaining a de-ashed coal extract may include exposing a coal to a rubber material in the presence of a coal-derived solvent to form a slurry 1202, elevating the temperature of the slurry to facilitate liquefying the coal and liberating a volatile matter 1204, and separating the insoluble components from the slurry to obtain a de-ashed coal extract, wherein the coal extract is suitable for downstream processing 1208. The rubber material may be from a rubber tire.

Figure 13:
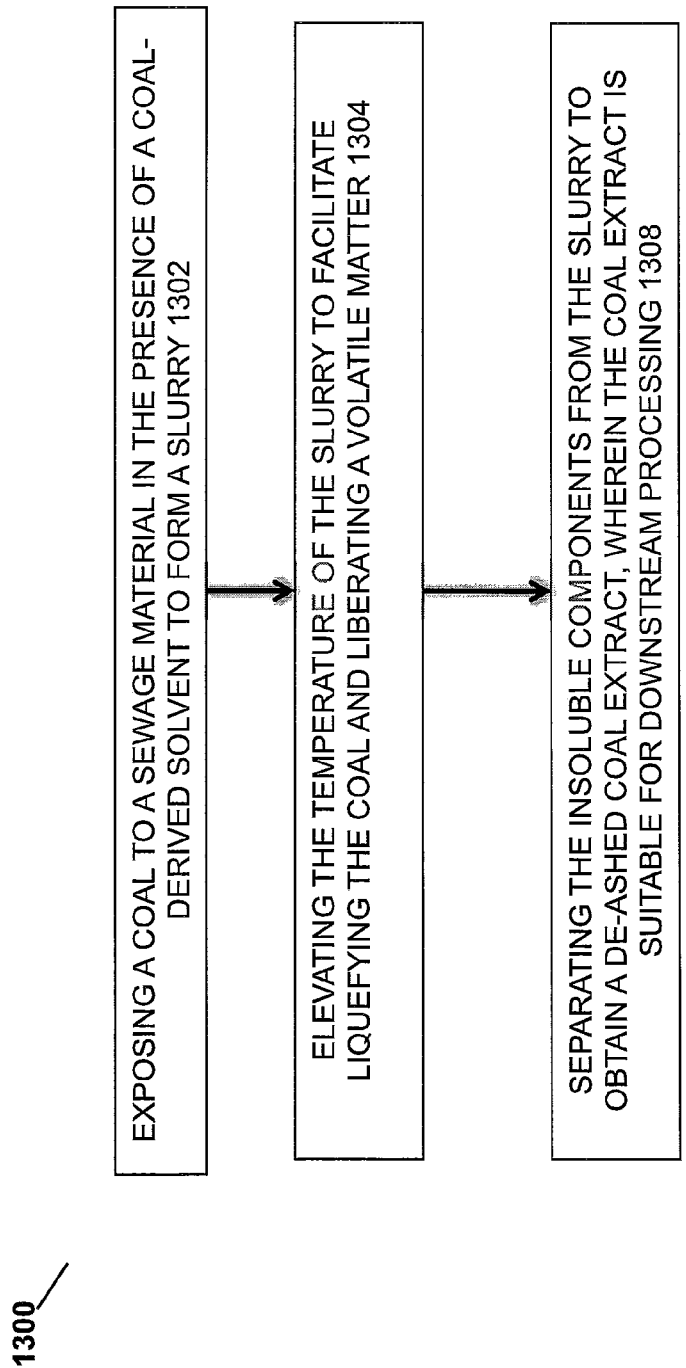
FIG. 13 depicts a method of a coal liquefaction process.

Referring to FIG. 13, a method of obtaining a de-ashed coal extract may include exposing a coal to a sewage material in the presence of a coal-derived solvent to form a slurry 1302, elevating the temperature of the slurry to facilitate liquefying the coal and liberating a volatile matter 1304, and separating the insoluble components from the slurry to obtain a de-ashed coal extract, wherein the coal extract is suitable for downstream processing 1308.

Figure 14:
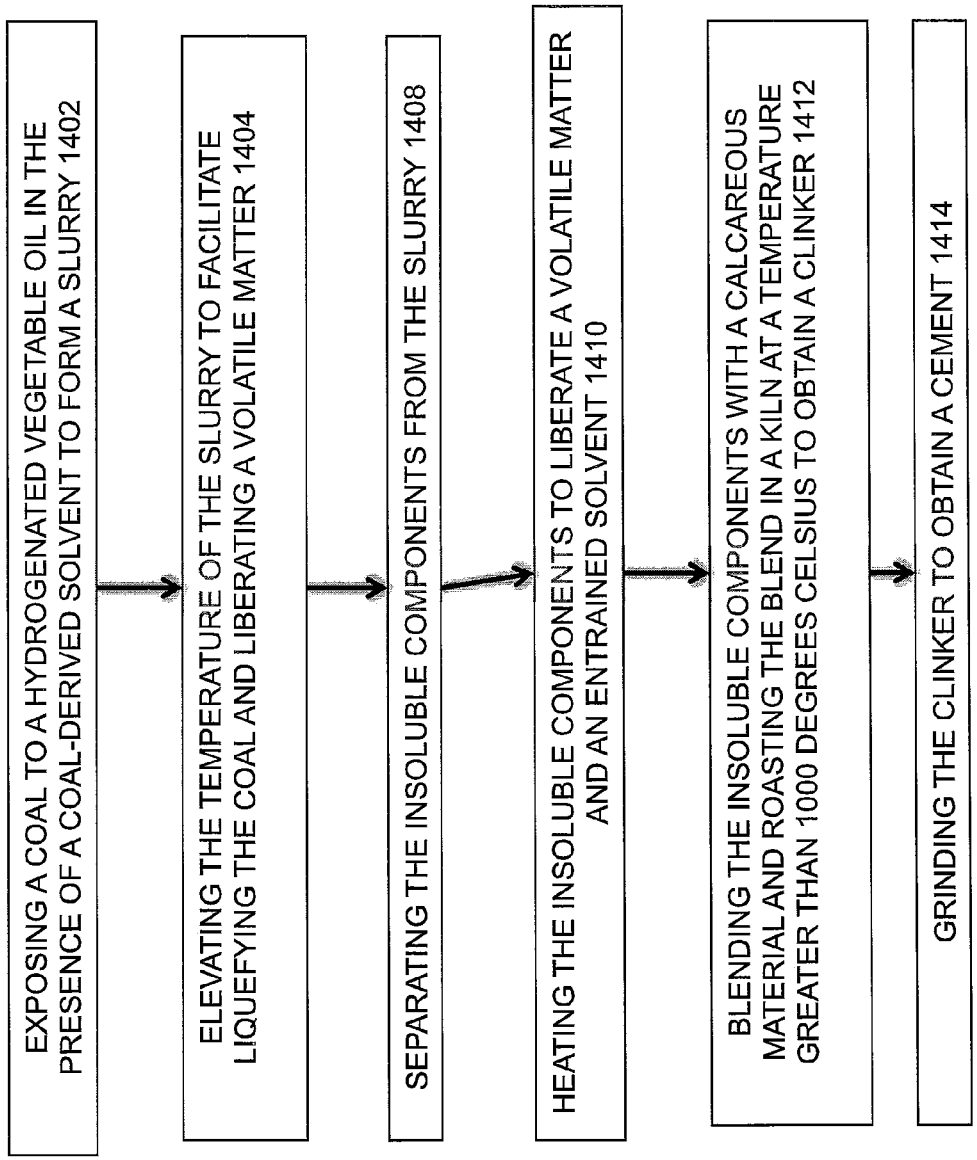
FIG. 14 depicts a method of obtaining a cement by-product of coal liquefaction.

Referring to FIG. 14, a method of obtaining a cement by-product of coal liquefaction may include exposing a coal to a hydrogenated vegetable oil in the presence of a coal-derived solvent to form a slurry 1402, elevating the temperature of the slurry to facilitate liquefying the coal and liberating a volatile matter 1404, separating the insoluble components from the slurry 1408, heating the insoluble components to liberate a volatile matter and an entrained solvent 1410, blending the insoluble components with a calcareous material and roasting the blend in a kiln at a temperature greater than 1000 degrees Celsius to obtain a clinker 1412, and grinding the clinker to obtain a cement 1414.

Further, the centrate 124 may be collected and immediately subjected to a petroleum-type refining process for producing transportation fuels. In an alternative embodiment, the centrate 124 may be further refined via distillation, coking, or other processes. In an embodiment, the centrate 124 may flow or may otherwise be introduced to a distillation column 130 such as a multi-tray distillation column, a Wiped Film Evaporator (WFE), or the like. For example, the WFE may include features such as vacuum distillation, short residence time, and a highly agitated thin film of feed product on a heated surface. These features may make the WFE suitable for handling heat-sensitive and viscous materials.

Further, the centrate 124 may be distilled either under vacuum or atmospheric pressure. While carrying out the distillation under atmospheric pressure, temperature may need to be increased to distill some of the volatiles. However, at high temperature, other components of the distillation mixture may get coked or cross-linked. Therefore, the distillation column 130 may carry out the distillation process under vacuum. Since the centrate 124 contains no quinolone-insoluble matter or ash, it is possible to obtain a pitch after processing the centrate. Distilling the centrate may result in a tailoring of the softening point, a difference in coke yield, or changes in other properties. For example, in some embodiments, distillation results in the pitch softening at about 109° C. The pitch 132 may start to coke at higher temperatures, such as above 400° C.

In an embodiment, the centrate 124 may be distilled to obtain a pitch 132 similar to coal tar binder pitch. In embodiments, the pitch 132 may be alternatively referred to as synthetic pitch. Further, the pitch 132 may not include any solvent or any insoluble material in it.

Additionally, the distillation process may remove some of the volatiles present in the centrate 124. In an embodiment, partial distillation of the centrate 124 may result in a heavy crude-like substance that may further be refined using the petroleum-type refining process. The heavy crude-like substance may be either produced directly from the distillate or by coking the pitch 132. In addition, the volatiles (that may be obtained from the distillation column 130) may be condensed to form liquids. The condensed volatiles 134 may be used as substitute crude or as solvent for additional executions of the coal liquefaction process. In embodiments, the volatiles may be plasticizers that may be added to increase the fluidity of a material.

The pitch 132 may be blended with other binder pitches so that the qualities are closer to a coal tar binder pitch. In an embodiment, when rubber tires are used as a liquefaction agent, carbon black obtained from the rubber tires may be incorporated into the pitch 132 and the resultant product may be similar to the conventional coal tar pitch binders.

It will be evident to a person skilled in the art that binder pitch may not be a usual product from direct coal liquefaction because there is typically still quinolone insoluble material in coal extract from prior art coal liquefaction processes. However, in the present disclosure, the extract 118 obtained from the reactor 102 is quinolone insoluble-free because of the separation step employed in the process. For example, centrifugation may separate the quinoline insoluble material from the extract. In embodiments, the Residual Oil Supercritical Extraction (ROSE) technique may be used for de-ashing liquefied coals Distillation may liberate low-boiling point species, including excess solvent (particularly any additional solvents employed). A purified, synthetic pitch may be collected (e.g., such as in a collection drum). This pitch may have enhanced aromaticity, increased softening point, increased cross-linking reactivity, and increased carbon coking value compared to the pitch properties prior to distillation. Upon cooling to a temperature below about 110° C., the resultant pitch generally solidifies. The pitch thus produced can have properties making it suitable for use as a binder pitch. In some embodiments, the pitch may be used either for carbon anodes for Hall Heroult cells for aluminum smelting, for graphite electrodes for electric arc furnaces, or for other purposes. The pitch produced in accordance with the embodiments may also be used for other purposes, such as, but not limited to, an impregnation pitch used to produce carbon composites, as well as fiber spinning pitch used to produce carbon fibers. The low-boiling point species removed in the solvent separation unit may be optionally recycled back to be blended with the solvents used for subsequent coal liquefaction, with or without an additional hydrogenation cycle.

In some embodiments, distillation yields light distillates, middle distillates, and heavy distillates. One use of the light distillates may be to obtain transportation fuels after subsequent refining, which can be accomplished using petroleum refining techniques and systems. One use of the middle distillates may be to recycle back as a starting material in the coal liquefaction process. One use of the heavy distillates may be to coke them to obtain high quality cokes.

In embodiments, an annealing process may take place in the distillation column 130 that may alter the properties of a resultant pitch. Further, it may be evident to those skilled in the art that annealing may only be effective in pitches that may not include quinoline insoluble material. The pitch 132 may include large discotic molecular clusters displaying afused, flat or polycyclic aromatic ring structure. At low viscosity, the clusters flow and are attracted to other clusters by the electrons in the Pi cloud associated with each of the ring clusters, thus causing the aromatic rings to stack. As the association becomes stronger, they form ordered structures, and eventually, a large domain of a liquid crystal called mesophase pitch. The mesophase pitch is denser than the parent pitch so it settles to the bottom of the distillation column. In one embodiment, upon delayed coking, this liquid crystal phase produces a very anisotropic coke, needle coke, needed for the manufacture of anisotropic graphite. Other cokes may likewise be obtained.

In an embodiment, the degree of annealing may change the degree of association between the clusters. The annealing process may facilitate production of an improved pitch. Further, annealing process variables may be modified to modify the anisotropy. In an exemplary embodiment, annealing may be carried out at different temperatures and anisotropy may change based on the annealing. —Higher anisotropic cokes with better conducting properties may be produced as a result of modification in the annealing process. For example, anode coke is only slightly anisotropic while needle coke or graphite coke are highly anisotropic. Other process variables include: temperature, pressure, residence time, gas flow rate, and the like. In embodiments, the pitch 132 may facilitate production of an impregnating pitch, a graphite pitch, an anode pitch, and the like. In some embodiments, two or more feedstock solvents may be blended together to tailor the properties of the synthetic pitch 132. By way of example, for binder and impregnating pitch applications, Table 2 below provides exemplary properties that may be achieved with embodiments of the methods of the present disclosure.

TABLE 2

| Pitch Properties | | |
|---|---|---|
| | Binder Pitch | Impregnating Pitch |
| Softening Pt. | 100-120° C. | 75-150° C. |
| Viscosity | <20 poise @ 160° C. | <50 cps @ 225° C. |
| Flash Pt. | ≧200° C. | ≧270° C. |
| Coking value (wt %) | 50-60 | 40-50 |

In an embodiment, the pitch may be hydrogenated, such as under hydrogen pressure, to produce an improved mesophase pitch upon annealing. The hydrogenated pitch is less reactive. Such improved mesophase pitches result in improved cokes, such as needle coke, with respect to the degree of anisotropy upon coking.

Figure 15:
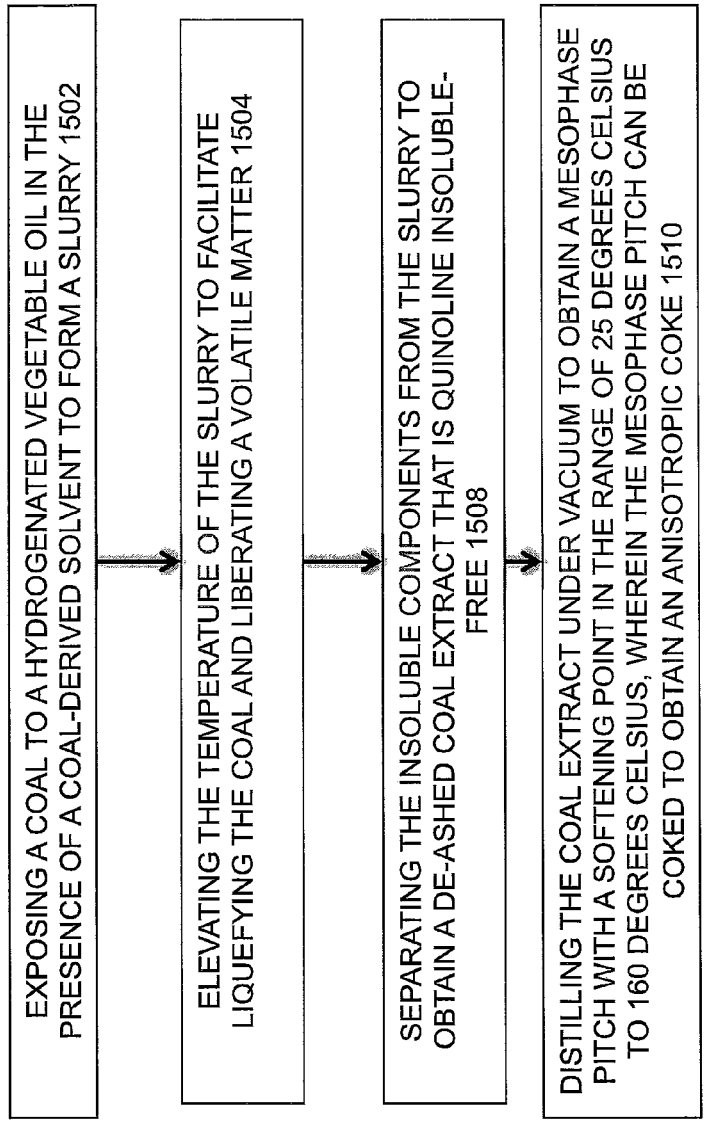
FIG. 15 depicts a method of obtaining a quinolone insoluble-free and ash-free mesophase pitch.

Referring to FIG. 15, a method of obtaining a quinolone insoluble-free and ash-free mesophase pitch may include exposing a coal to a hydrogenated vegetable oil in the presence of a coal-derived solvent to form a slurry 1502, elevating the temperature of the slurry to facilitate liquefying the coal and liberating a volatile matter 1504, separating the insoluble components from the slurry to obtain a de-ashed coal extract that is quinoline insoluble-free 1508, and distilling the coal extract under vacuum to obtain a mesophase pitch with a softening point in the range of 25 degrees Celsius to 160 degrees Celsius, wherein the mesophase pitch can be coked to obtain an anisotropic coke 1510. A quinolone insoluble-free and ash-free pitch may be obtained by the method.

Figure 2:
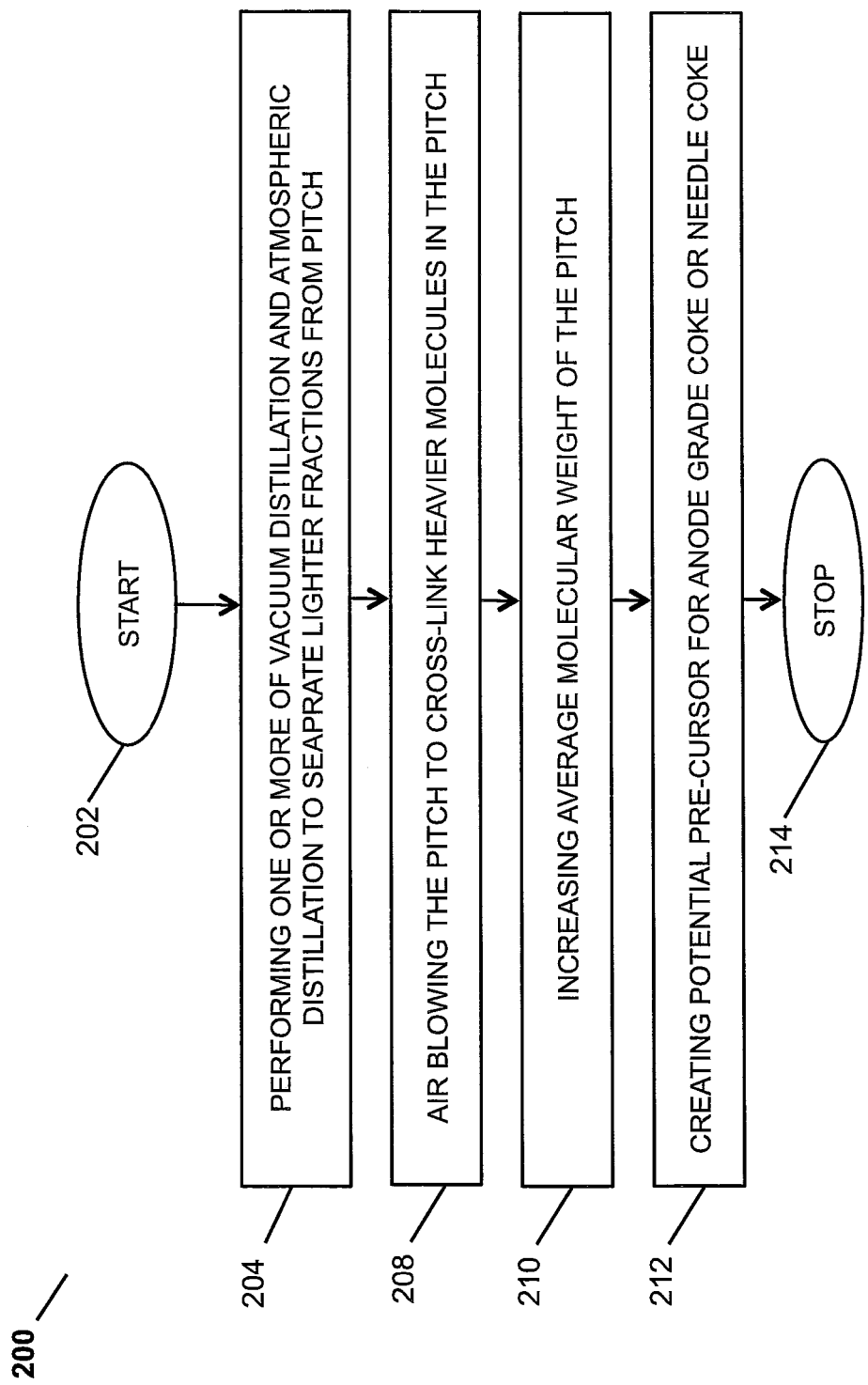
FIG. 2 illustrates a flowchart illustrating a method of increasing the average molecular weight of a pitch product, in accordance with an embodiment of the present invention.

In an embodiment, optionally, the synthetic pitch 132 may be air blown. FIG. 2 illustrates a method 200 of increasing the average molecular weight of a pitch, in accordance with an embodiment of the present invention. The method 200 may start at step 202. At step 204, the pitch may be distilled for separating lighter and heavier molecule fractions. Further, at step 208, the pitch may be air blown to cross-link the heavier molecules. In embodiments, air blowing of the synthetic pitch may be used to cross-link hydrocarbons and solvent molecules that may result in modifying the softening point and increasing the coke yield. The cross-linking may facilitate an increase in the average molecular weight of the pitch as shown in step 210. At step 212, a potential precursor for anode grade coke, needle coke, and the like may be created. The anode grade coke may be slightly anisotropic coke and the needle coke may be highly anisotropic coke. The method 200 terminates at 214. In an embodiment, a product produced by the process includes a highly anisotropic (rod-like) coke, which may be of a particular long range order or crystallinity.

In embodiments, if air blowing is done prior to removing the light fractions from the pitch 132, the resultant pitch may produce an isotropic coke that may be unsuitable for anode grade coke, needle coke, and the like. Further, air blowing of the pitch 132 may be performed at a temperature between 250° C. and 450° C., 70° C. and 500° C., and the like. In an example, to accomplish this, air may be bubbled through a tube that may be inserted in a tank containing the pitch 132. In an alternative embodiment, a sparger may be used for mixing air and the pitch 132. In embodiments, the pitch 132 may be further treated through various downstream processes such as hydrothermal cracking, hydrodealkylation, delayed coking, hydrodesulphurization, steam cracking, catalytic cracking, and other refining techniques.

Figure 16:
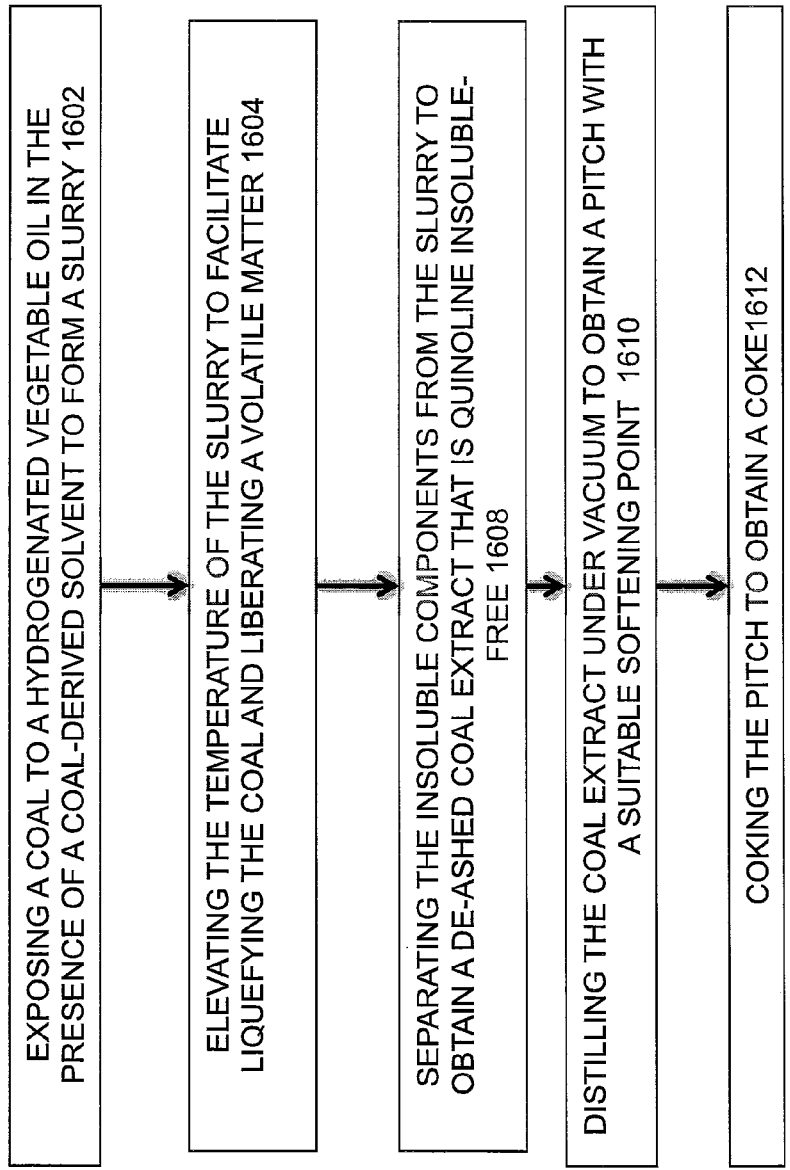
FIG. 16 depicts a method of obtaining a high quality coke from a low rank coal extract.
Figure 17:
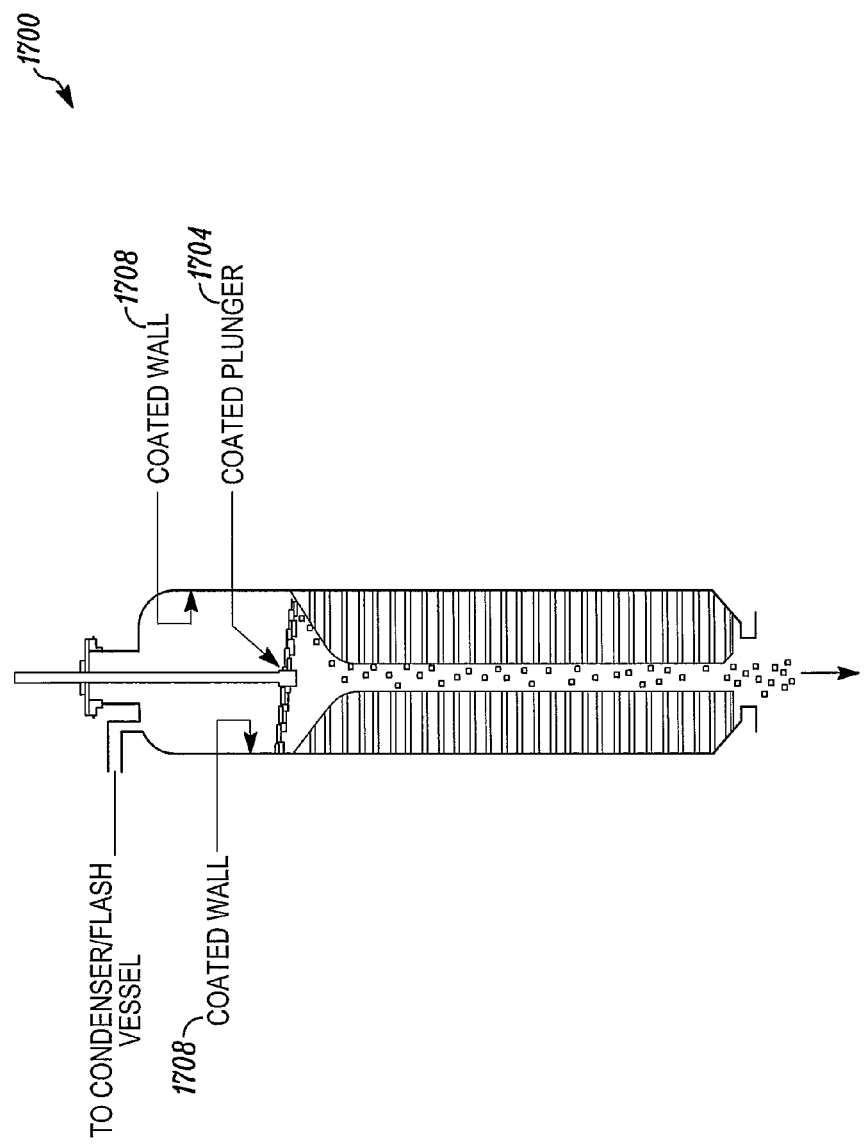
FIG. 17 depicts a coated coker and coated plunger.

Referring to FIG. 16, a method of obtaining a high quality coke from a low rank coal extract may include exposing a coal to a hydrogenated vegetable oil in the presence of a coal-derived solvent to form a slurry 1602, elevating the temperature of the slurry to facilitate liquefying the coal and liberating a volatile matter 1604, separating the insoluble components from the slurry to obtain a de-ashed coal extract that is quinoline insoluble-free 1608, distilling the coal extract under vacuum to obtain a pitch with a suitable softening point 1610, and coking the pitch to obtain a coke 1612. The coke may be at least one of an anisotropic coke, a metallurgical coke, a graphite coke, an anode coke, and a needle coke. The method may further include air blowing the pitch to crosslink molecules in the pitch, the air blowing of synthetic pitch used for at least modifying a softening point and increasing coke yield.

Figure 7:
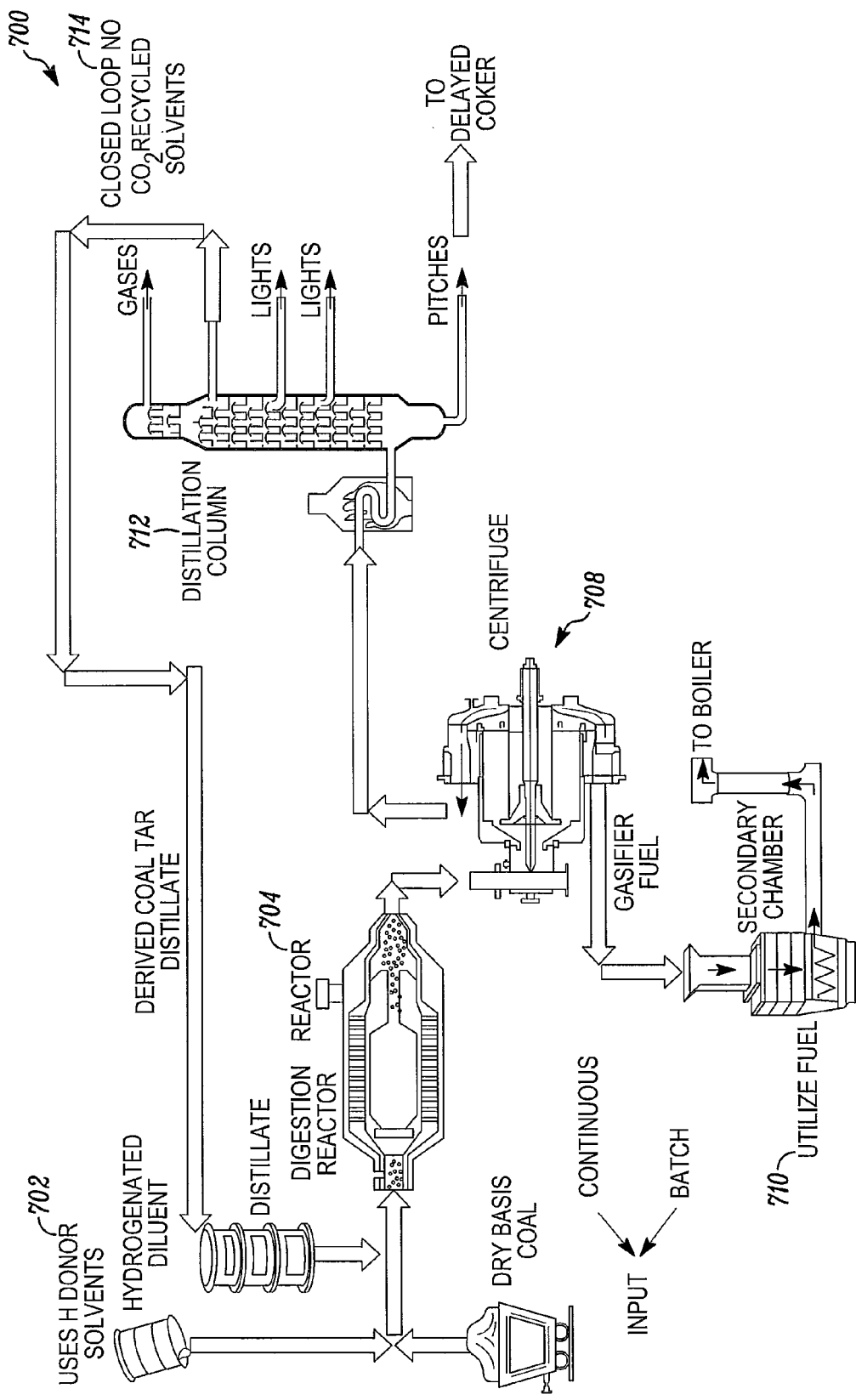
FIG. 7 depicts an embodiment of the coal liquefaction system.

Referring to FIG. 7, an embodiment of the coal liquefaction system is depicted. A hydrogen donor solvent 702 is mixed with coal and is transported to a reactor 704 for liquefaction. After liquefaction, the coal is either pumped or flows by gravity to a centrifuge 708. One product from centrifugation may be gasifier fuel, which may be utilized 710 in the process to generate heat. The centrate is transported to a distillation column 712. Distillation results in separation of components of the centrate based on differences in boiling points. Depicted here are multiple components separated from the centrate, including pitches, light distillates, middle distillates, and gases. In this embodiment, the middle distillate is recycled 714 back into the process. Thus, the system is closed loop. Additionally, no $CO_2$ is generated. Pitches may be transported to a delayed coker for coking. The centrate and/or the distillates may be transported to a petroleum refinery for processing to fuels, such as transportation fuels or other hydrocarbon products.

The coal liquefaction process may be continuous or batch. For example, coal may be continually conveyed into the reactor, the coal extract may be continuously pumped into the centrifuge or may flow continuously by gravity, a continuous use centrifuge may be used such as a scroll decanter, the centrate may continuously be pumped from the output of the centrifuge to the distillation column, and the pitches may continuously be siphoned off or pumped from the distillation column to a coker. Using a coated coker system described later herein, the coker may also be operated continuously to remove coke from the coking drum as it is formed.

In an embodiment, the system for coal liquefaction may be located near a coal mine so that transport of the coal is minimized. Alternatively, coal may be transported to the system via boat, truck, rail, or the like. The coal may be pre-treated prior to liquefaction. For example, the coal may be dried using a hot air furnace, microwave treatment, or the like. Other pre-treatments may also be used, such as exposure to calcium, methanol/HCl, swelling solvents such as ethanol, THF, and tetrabutyammonium hydroxide (TBAH), steam, crushing, grinding, pulverization, and others.

Figure 18:
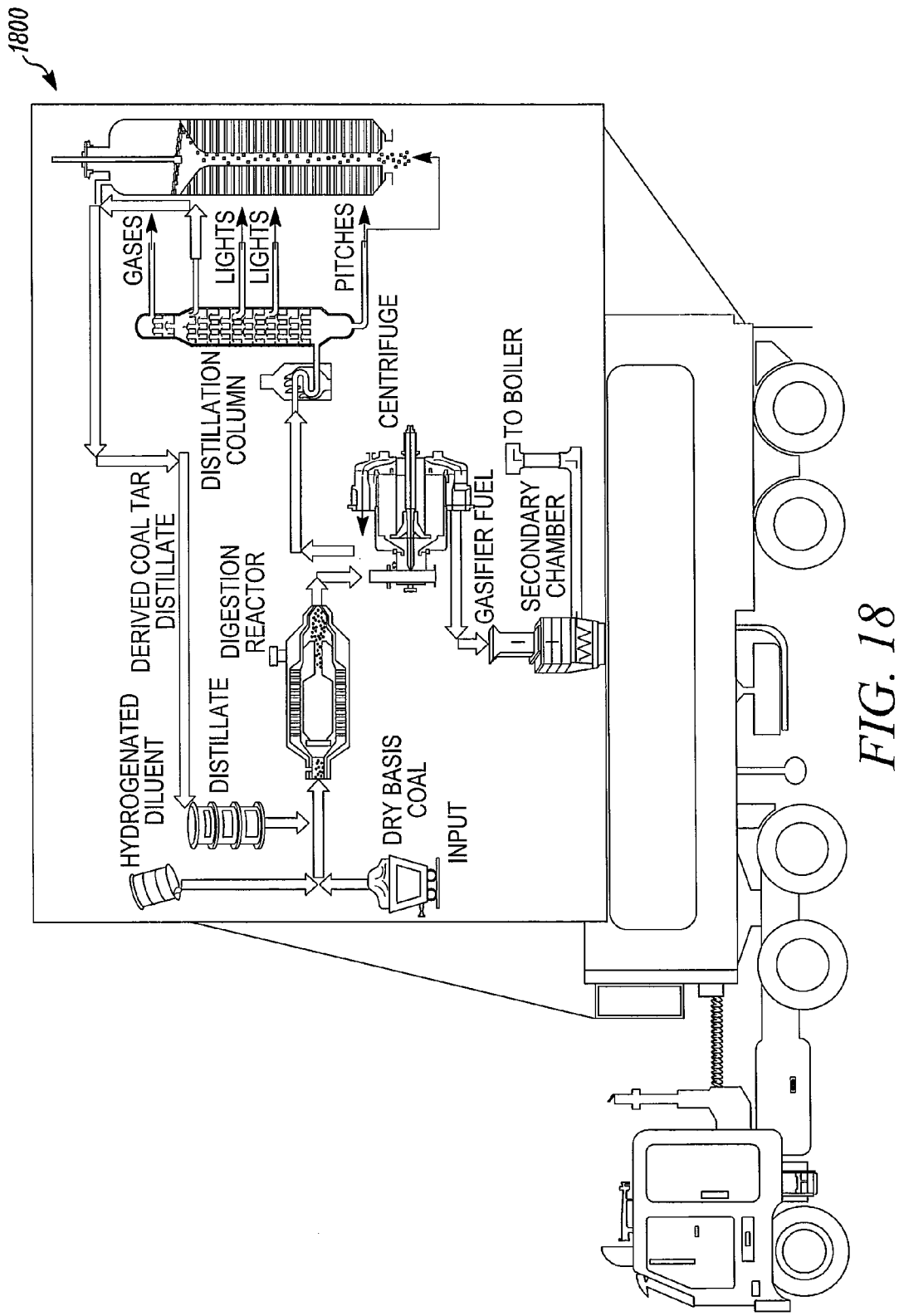
FIG. 18 depicts a mobile coal liquefaction unit.

In an embodiment, the system for coal liquefaction may be modular and sized to be disposed in a mobile unit, such as one or more rail cars, one or more semi-truck trailers, and the like. For example, and referring to FIG. 18, an exploded view of a semi-truck trailer carrying the system for coal liquefaction, including a distillation column, coker, and furnace, is depicted. It should be understood that not all embodiments of the modular/mobile unit will include all of the components depicted in FIG. 18. In an embodiment, a modular coal liquefaction system may include a reactor for exposing a coal to a hydrogenated vegetable oil in the presence of a coal-derived solvent to form a slurry, a heater that elevates the temperature of the slurry in the reactor to facilitate liquefying the coal and liberating a volatile matter, and a centrifuge that separates the insoluble components from the slurry to obtain a de-ashed coal extract, wherein the coal extract is suitable for downstream processing, wherein the reactor, heater, and centrifuge are adapted to be modular. The system may further include a distillation column that distills the de-ashed coal extract to obtain a pitch. The system may further include a coker that cokes at least one of the de-ashed coal extract and the pitch to obtain a coke. The system may be adapted to be modularly disposed on a rail car. The system may be adapted to be modularly disposed on a semi-truck trailer. In another embodiment, a modular coal liquefaction system may include a reactor for exposing a coal to a hydrogenated vegetable oil in the presence of a coal-derived solvent to form a slurry, a heater that elevates the temperature of the slurry in the reactor to facilitate liquefying the coal and liberating a volatile matter, a centrifuge that separates the insoluble components from the slurry to obtain a de-ashed coal extract, wherein the coal extract is suitable for downstream processing, a distillation column that distills the de-ashed coal extract to obtain a pitch, and a coker that cokes at least one of the de-ashed coal extract and the pitch to obtain a coke, wherein the coker comprises a coated coking drum that receives the de-ashed coal extract or the pitch, wherein the coking drum is coated with a coating comprising at least one of a chromium, an aluminum, a nickel, or an alloy thereof, wherein the reactor, heater, centrifuge, distillation column, and coker are adapted to be modular. The system may be adapted to be modularly disposed on a rail car. The system may be adapted to be modularly disposed on a semi-truck trailer.

The pitch 132 obtained from the distillation column 130 may be pumped directly into a coke producing device 138 such as a coker, a coke battery oven, and the like at a given temperature to instantaneously turn the pitch 132 into coke. This process may also be known as delayed coking. Delayed coking may use lower temperatures and a longer residence time than traditional coking and may produce both solid cokes as well as liquid or gaseous material.

In an embodiment, the pitch 132 may be coked or delay coked in a coke battery oven (hereinafter referred to as coke oven). Coking may drive off volatile gases. Further, the chemical function of the pitch 132 may change as a function of time. In embodiments, various parameters of the coker 138 may be varied as per the requirement. Examples of the parameters may include, but are not limited to, ramp rate, pressure, temperature, gases added in steam, addition of nitrogen, addition of air, and the like.

For example, during the process, the pressure within the coker 138 may be increased above 50 lbs (the pressure that is generally used for coking) to change the bulk density of the pitch 132. Further, the pitch 132 may be treated at higher temperatures such as between 400° C. and 600° C. At such higher temperatures, lighter molecules may be liberated from the pitch 132 in the form of gas or condensable vapors. Once the gases are released from the pitch 132, a solid non-melting residue may be obtained. In some embodiments, the residue may mostly contain carbon and may be referred to as green coke. When the pitch 132 is baked at 500° C., discotic molecules may enable formation of coke as stacked crystals. In embodiments, different types of binder pitches may result in formation of cokes of different properties.

The coke may contain aromatic hydrocarbons and may become more anisotropic upon heating, such as at a temperature of 1000° C.-1400° C. to produce calcined coke, such as anode grade coke, needle grade coke, and metallurgical coke. Calcination of green coke may reduce the overall weight by about 5%, but at the same time it may make the coke stronger. In embodiments, gases that may be removed during calcination may include about 85% hydrogen gas.

Coke calcining is a process wherein the coke may be thermally upgraded to remove associated moisture and volatile combustion matter (VCM). The calcining process may also improve critical physical properties, such as electrical conductivity, real density, oxidation characteristics, and the like. Further, the calcining process may be a time-temperature function with control variables such as heating rate, VCM/air ratio, calcination temperature, and the like. To obtain the calcined coke properties required by the carbon and graphite industries, the coke 140 may be subjected to temperatures of 1000° C.-1400° C. to refine its crystalline structure. The final quality of the calcined coke may be directly related to the specific characteristics and quality of the coke fed to the coker or calciner.

However, the supply of good quality coking coal is declining, so much so that coking coals or metallurgical coals may be mined from seams as low as 28 inches. The present invention may enable coking of non-caking coals such as sub-bituminous and lignite coals, whose availability is immense. These non-caking coals are referred to as coal that may char and may not agglomerate to produce coke.

In embodiments, the coke 140 may not be crystalline; however, the coke 140 may have long-range order of positioning of molecules. In an example, graphite is anisotropic as opposed to a cube, which is isotropic.

The degree of the long-range order may modify the reflected light. The more anisotropic the coke is, the more rod-like it is. For example, graphite may be hexagonal on one side and may be needle like on another side. In embodiments, anisotropy of the coke 140 may be proportional to the value of the coke 140. Referring to graphite, carbon molecules in the graphite may arrange themselves into a lattice structure, which may allow free movement of electrons, thereby making graphite a good conductor.

In embodiments, the pitch 132 may be used for preparing isotropic coke. The isotropic coke may be ground to make isotropic graphite (also referred to as nuclear graphite). As a bulk property, the nuclear graphite may be isotropic and may not contain any ash.

In an embodiment, the coal 104 and the pitch 132 may be admixed in the coker 138 for delayed coking or may be mixed with petroleum resids.

In embodiments, the tails 124 obtained from the centrifugation process may include mineral matter that may be insoluble. The tails 124 may either be clinkered for conversion into cement or the tails 124 containing the mineral matter may be heated in the presence of air to a temperature exceeding 1000° C. The heat treatment may completely oxidize and melt the mineral matter present in the tails 124 and may form a slag.

Conventionally, a method for removing sulfur from sulfur-containing hydrocarbon liquids such as crude petroleum or coal extract may be described as hydrodesulfurization. This process may involve exposing the hydrocarbon liquid to a high temperature pressurized hydrogen gas in the presence of a catalyst. The result may be the formation of hydrogen sulfide, which may be removed by dissolving the hydrogen sulfide in water. In embodiments, the present invention may provide a method for producing reduced sulfur hydrocarbon liquids. The present disclosure describes the use of a hydrogenated liquid such as HVO for removing sulfur from crude petroleum liquids. The HVO may be placed in a reactor and mixed with the crude petroleum liquids. Further, this blend may be heated at about 400° C.

In embodiments, the reactor is typically not pressurized with a gas. However, the vapor pressure of constituents in the blend may result in raising the reactor pressure to about 1000 psig. As a result, sulfur from the crude petroleum liquids may react with HVO to form hydrogen sulfide, which may be removed as a vapor, leaving behind a blend of hydrocarbons with low sulfur content. The resultant blend of vegetable oil and petroleum may be further refined with conventional refining processes.

In an exemplary embodiment, graphite may be formed from the coke 140 and the pitch 132. The coke 140 and the pitch 132 may be extruded through holes of an oven along with highly viscous material to enable formation of an electrode. The electrode may be treated with gas that may be passed through channels for again forming coke. This coke may be mixed with impregnation pitch and may be impregnated into the holes of the electrode. The impregnation may take place under application of pressure. Further, the oven may bake the blend of coke and the impregnation pitch. The resulting product may be taken through the same procedure, until a required density of the resulting product may be achieved. Such a product may be referred to as greenware.

Further, electrodes may be added to the greenware and it may be heated to about 2800° C. The heating may facilitate ordering of the discotic molecules to obtain graphite.

In embodiments, the mesophase pitch may be extruded and graphitized by heat treatment, which may result in the formation of carbon fibers similar to human hair in dimension. The heat-treated mesophase-pitch-derived carbon fibers may have high Young's modulus and high thermal conductivity. In an embodiment, the mesophase pitch may have high surface tension that may enable the mesophase pitch to stick to itself and thus, may differentiate it from the binder pitch.

In embodiments, only 40% of crude oil may include ingredients that may be useful for the production of high-quality fuels. The remaining components of crude oil may be heavy, poor performing fuels. These heavy fuels may be converted to usable transportation fuels through cracking. In an example, hydrogenated vegetable oil and crude oil may be treated at high pressure and temperature in the presence of a catalyst. The high pressure and high temperature may facilitate hydrogen from the HVO to be combined with the crude oil. The combined influences of the catalyst, pressure, and heat may cause the hydrogen and the hydrocarbon molecules to split. The hydrogen atoms may immediately combine with the hydrocarbons and form a light oil. Accordingly, hydrogenation may enable recovery of gasoline from the crude oil.

The ingredients of the carbon-based fuel type materials may be classified by solubility fractions. For example, oils may be known as that portion of the fluid that may be soluble in cyclohexane. Asphaltene are those materials that may be insoluble in cyclohexane, but may be soluble in tetrahydrofuran. Further, pre-asphaltenes are materials that may be insoluble in both hexane and tetrahyudrofuran. Likewise, pitches may be classified based on their solubility. In an example, toluene soluble pitches may be light. Quinoline insoluble pitches may prevent formation of mesophase. These pitches may include fixed carbon or carbon black additives.

In embodiments, coal liquids may be blended with 10-95% alcohol to create a motor fuel with high octane rating and compatible combustion kinetics. Further, coal liquids are highly soluble in alcohol. Moreover, the high energy density of coal liquids may act to increase the energy density of the blend. The aromatic content of coal liquids may enable the blend to be compatible with polymer seals. In addition, although the coal liquids are inherently slow burning, they are combusted more rapidly in the presence of a combusting alcohol. Hence, the combination of coal liquids and ethanol may be favorable as compared to either component used in its pure state or blended with gasoline. Therefore, CE-85, which may include 85% ethanol and 15% coal liquids, may be sought as non-petroleum derived motor fuel.

In embodiments, Fischer-Tropsch liquids may be used in place of the alcohol, while direct-liquefied coal liquids may be used as blending agents. For example, Fischer-Tropsch liquids may be blended with coal liquids, including petroleum derivatives optionally. The Fischer-Tropsch process may facilitate reaction of methane or gasified coal with air in the presence of a catalyst to create synthesis gas, which may be a mixture of carbon monoxide and hydrogen. Using another catalyst, the synthesis gas may then be converted to a mixture of liquid hydrocarbons. The second catalyst may be an iron or cobalt-based commercial catalyst. The present disclosure may not involve the production of synthesis gas or conversion of synthesis to liquids, but instead may involve production of coal liquids via mild direct liquefaction that may then be blended with Fischer-Tropsch liquids to produce a substitute kerosene or jet fuel.

In embodiments, the coal 104 may be optionally dried prior to the preparation of slurry. Pre-drying the coal 104 may result in enhanced solubility of the coal 104. In an embodiment, the coal 104 may be pre-dried by using the waste heat of the reactor 102. In another embodiment, the coal 104 may be passed through a pre-drying zone for removing moisture content of the coal 104 prior to its addition to the slurry. Pre-drying may include microwave treatment.

In embodiments, the solvent that may be used as the additive 110 may or may not be hydrogenated. For example, the HVO, when used as a solvent, is already hydrogenated; however, other feedstock solvents, which may not be hydrogenated, may also be used as the additive 110. The feedstock solvents may include a hydrocarbon material that may have a softening temperature of less than about 200° C. and may contain at least 10% hydrocarbon species having a boiling point of over 350° C. When a non-hydrogenated solvent is used as the additive 110 in the slurry, the solvent may be heated to a temperature of between 200° C. and about 500° C. in a hydrogen atmosphere. Further, a hydrogen pressure of up to about 3000 psig may be applied such that the solvent of the extraction mixture has absorbed hydrogen content (by weight) between 0.1% and 10%.

Figure 3:
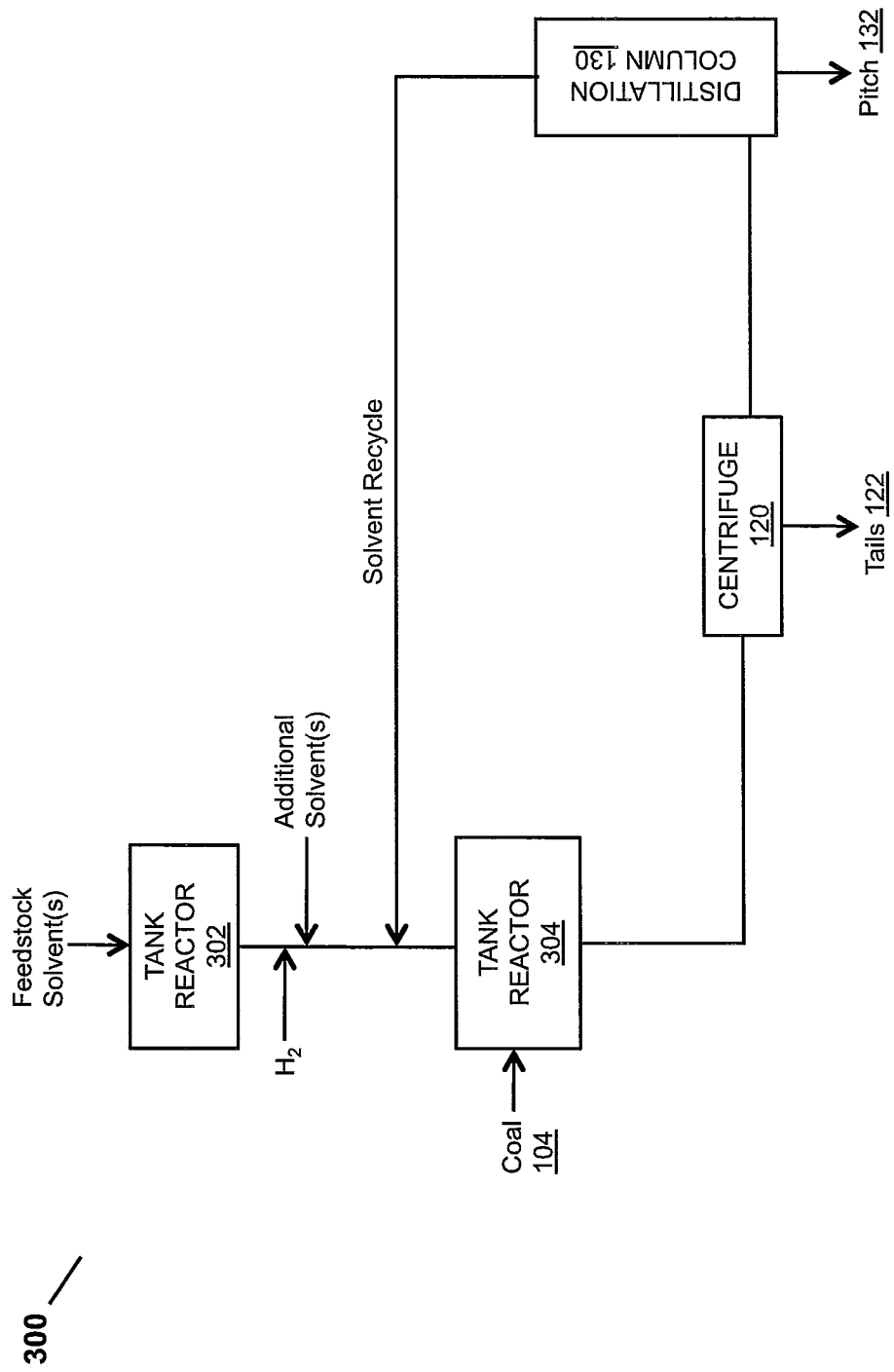
FIG. 3 illustrates a block flow diagram of an example of a processing system that may be used to produce synthetic pitch, in accordance with an embodiment of the present invention.

FIG. 3 illustrates a block flow diagram of a processing system 300 that may be used to produce pitch, in accordance with an embodiment of the present disclosure. The processing system 300 may include a tank reactor 302. Hydrogen gas may be used to hydrogenate a portion of the feedstock solvent. Optionally, a catalyst, such as, but not limited to, iron, cobalt, nickel, molybdenum, tin, salts of the foregoing metals, or mixtures of any of the foregoing, may also be added to the tank reactor 302 to enhance the absorption of hydrogen by the feedstock solvent. Further, the feedstock solvent may be hydrogenated such that mass of the feedstock solvent may be increased by up to several percent due to the absorption of hydrogen.

After hydrogenation of at least a portion of the feedstock solvent, the hydrogenated solvent may be combined with one or more un-hydrogenated feedstock solvents, and/or one or more additional solvents (e.g., tetralin). The solvent that has been removed from the pitch 132 may be blended with the feedstock solvent prior to being added to a second tank reactor in which the extraction takes place. This solvent recycle stream may include not only solvent (feedstock and additional solvent) and solvent fractions removed from the pitch, but also other light hydrocarbons extracted from the coal 104. As used herein, "light hydrocarbons" may refer to materials having a boiling point lower than about 200° C., making them difficult to incorporate into the pitch 132 intended to withstand de-volatilization until over 350° C. Recycling of a portion of the solvent may permit dissolution of additional quantities of the coal 104. Alternatively, the portion of solvent removed from the pitch 132 may be considered a separate product (e.g., for use as an octane enhancer).

Further, after hydrogenation, the feedstock solvent, optional additional solvent, and recycled solvent may be transferred to a tank reactor 304 and may be combined with coal 104 (or other solids-containing material) to be extracted. The tank reactor 304 may be operated at ambient pressure. The extracts obtained from the tank reactor 304 may be introduced to the centrifuge 120. The centrifugation and further distillation of centrate through the distillation column 130 has been explained earlier and is not explained again for the sake of brevity.

Generally, a coker may be made up of a steel material. Coke may stick to the sides of the coker and may be removed by scraping off the deposits using water knives or other means.

In embodiments, the coker may be coated with chrome to facilitate removal of coke. The chrome coating may be erosion resistant and may be capable of withstanding heavy residual deposits. In case of a chrome coating, the coke may be pushed out using a plunger, a piston, and the like. Further, an auger may be built into coker that may enable transporting the coke to the upper portions of the coker. Additionally, a coating of aluminum or nickel may be used instead of chrome as coke does not dissolve in aluminum or nickel.

In embodiments, the coker may be coated with materials such as chrome, aluminum, aluminum alloys, and nickel alloys. In an example, the coker may be configured with a gear in the center for removing the coke. In another example, the coker may be configured with a hydraulic aim or plunger for facilitating removal of the coke. The gear and the plunger may also be coated with any of the materials mentioned above. In yet another example, the coker may include an Archimedean spiral-based screw (also referred to as an Archimedes' screw) that may be used for drawing out coke from a reservoir of pitch. The coke may then be sent to a calciner. Further, in case of a continuous coker, the Archimedes' screw may be used for continuously providing coke.

Further, the coated coker may be configured in a smaller size than other commercially available cokers. Accordingly, the coated cokers may facilitate mobilization of coal liquefaction plants. In embodiments, the mobile cokers may be implemented on one or more trucks or trailers or one or a series of rail cars, or the like.

In embodiments, odor may be produced in the reactor 102 due to presence of toxic gases such as hydrogen sulfide, methylmercaptan, and mercaptan. The reactor 102 may include a column for mixing alkalis such as NaOH for mitigating the odor. The alkali column may include Raschig rings that may be supported on a porous bed. The porous bed may provide more surface area to the alkali column. Further, a showerhead may be configured at a top portion of the alkali column to be connected to the alkali reservoir. In an example, the reservoir may supply NaOH to the showerhead for being shot inside the column. Further, the reservoir may supply NaOH to the alkali column through a pump. The pump may allow the NaOH to flow from the reservoir to the showerhead. Further, a pipe for ejecting the odor producing gases into the coker may be configured near a bottom surface of the column.

In use, the odor producing gases (hydrogen sulfide and mercaptan) flowing upwards may come in contact with the NaOH flowing downwards. When NaOH and the gases meet, hydrogen sulfide and mercaptan may become salts and may get captured in a solution. This conversion may continue until the solution may either be used in the process itself or may be discarded later.

Although the present disclosure has been described in conjunction with the production of liquid fuels and cokes in a delayed coker, other methods and systems may be possible to carry out the present disclosure without limiting the spirit and scope of the present invention.

Figure 6:
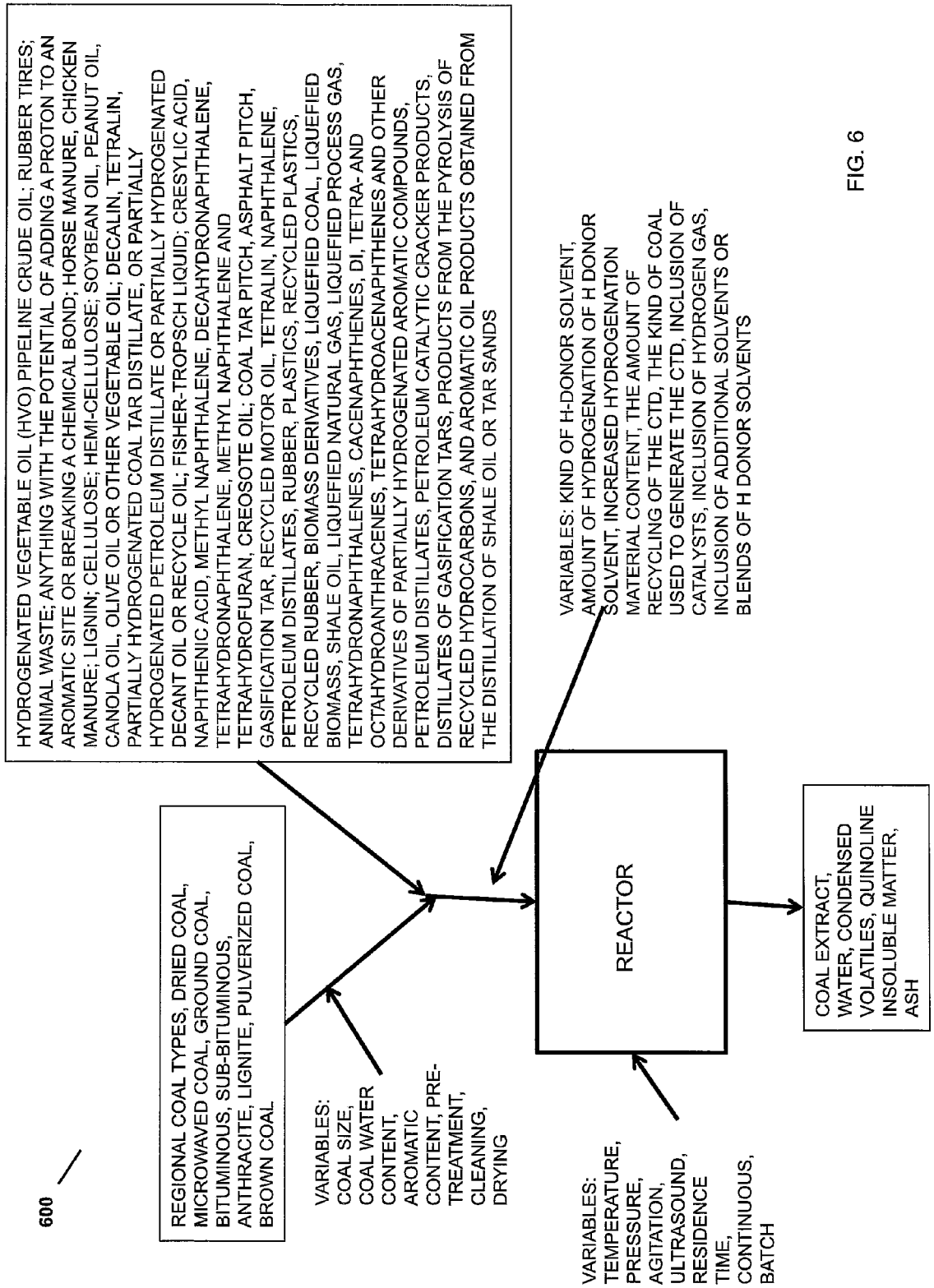
FIG. 6 depicts a process flow diagram for coal liquefaction.
Figure 8:
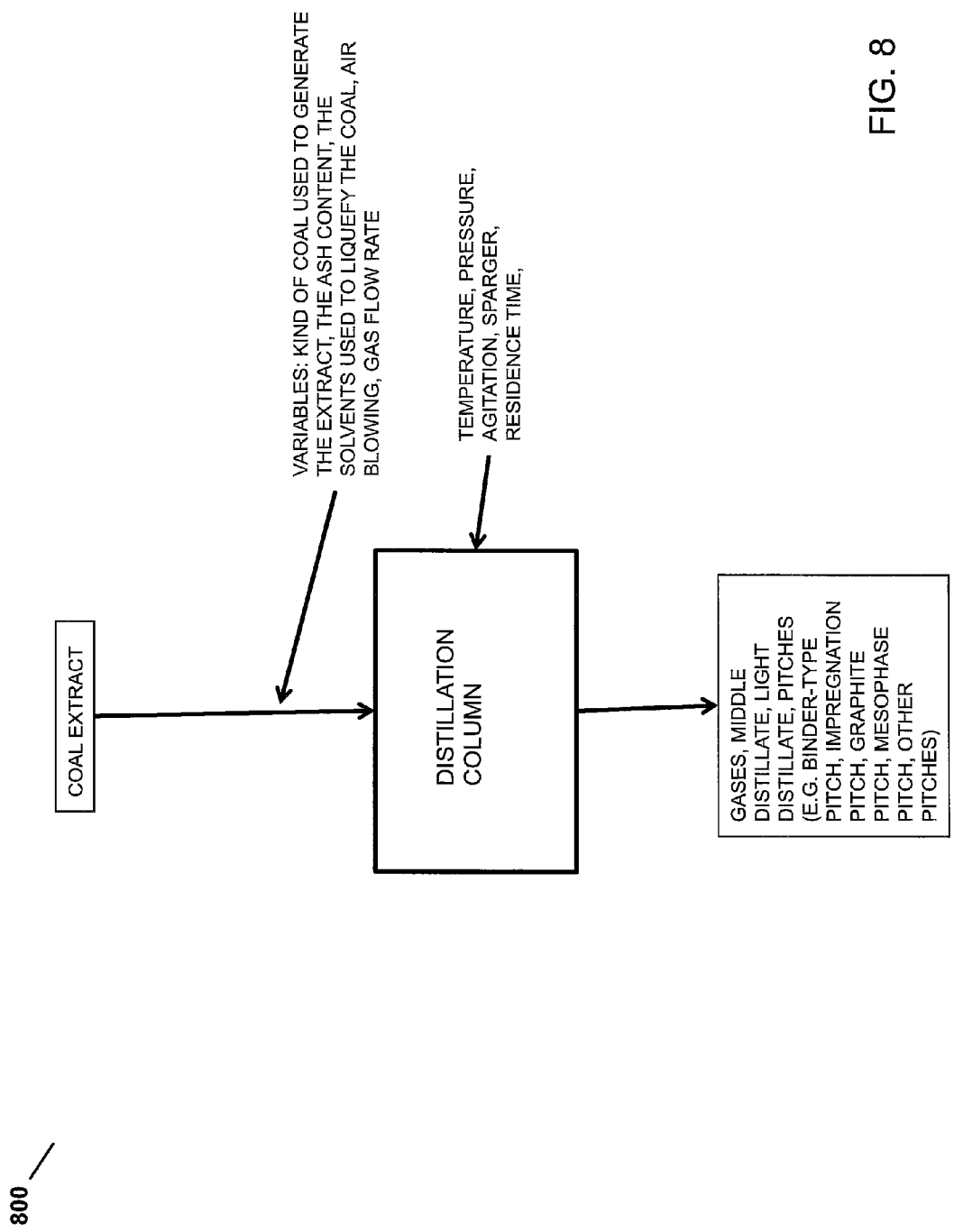
FIG. 8 depicts an embodiment of a process flow of a distillation column.
Figure 9:
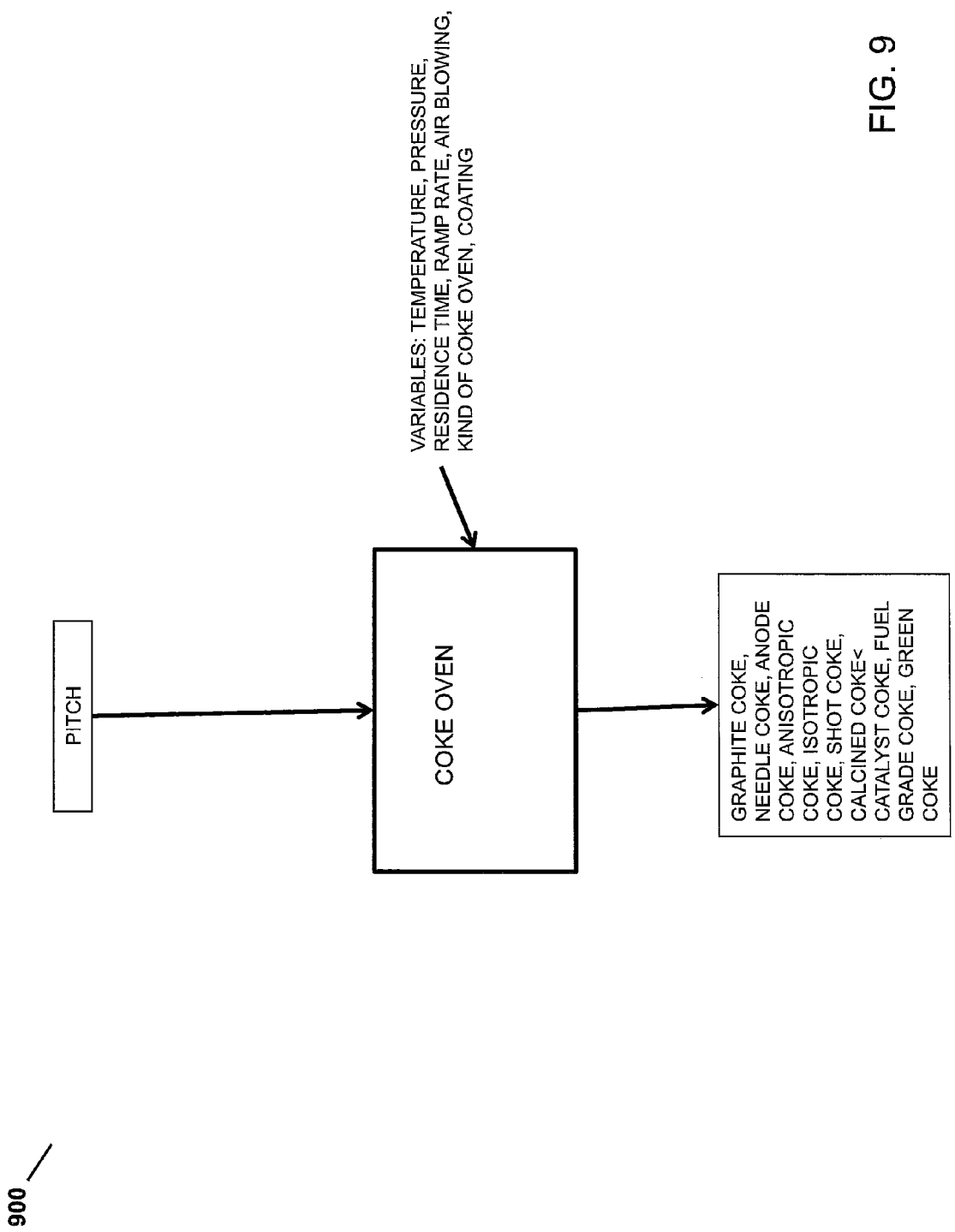
FIG. 9 depicts an embodiment of a process flow of a coker.

The conditions of the process may change with choice of coal to liquefy and desired endpoint. For example, and referring to FIG. 6, various coals may be liquefied by the process, such as regional coal types, dried coal, pulverized coal, microwaved coal, ground coal, bituminous, subbituminous, anthracite, lignite, brown coal, and the like. Such coals may vary in size, water content, aromatic content, pre-treatment, cleaning, drying, and the like. Thus, certain process changes may be made to accommodate the different coal types, including the kind of hydrogen donor solvent used, amount of hydrogenation of the hydrogen donor solvent, increased hydrogenated material content, the amount of recycling of the CTD, the kind of coal used to generate the CTD, inclusion of catalysts, inclusion of hydrogen gas, inclusion of additional solvents or blends of hydrogen donor solvents, and the like. Variables related to the reactor include temperature, agitation, ultrasound, residence time, continuous processing, batch processing, and the like. In the separation process, the speed of separation, duration, and the viscosity of the slurry may all be altered to yield modified tails and/or modified centrate. Referring to FIG. 8, in the distillation process, any of temperature, pressure, residence time, sparger use, air blowing, and gas flow rate may be varied to modify the distillation output, which can be any of gases, middle distillate, light distillate, pitches (e.g. binder-type pitch, impregnation pitch, graphite pitch, mesophase pitch, other pitches), and the like. The type of pitch obtained depends on the process variables and the coal extract, such as the kind of coal used to generate the extract, the ash content, the solvents used to liquefy the coal, and the like. Referring to FIG. 9, coke yields and types may be varied by changes in pressure, temperature, ramp rate, air blowing, residence time, coating of the coker, type of coke oven used (e.g. delayed coker, fluid coker, Flexicoker, beehive oven, coke battery), and changes in starting pitch material, such as use of the any of the pitches described above in reference to FIG. 8. Depending in the input pitch and the process variables, possible coke outputs include graphite coke, needle coke, anode coke, anisotropic coke, isotropic coke, shot coke, sponge coke, calcined coke, catalyst coke, fuel grade coke, and green coke.

The entire process may be controlled by a computer. The system may include sensors and sensor feedback control to facilitate quality control and measurements. For example, sensors may be used to measure the viscosity and temperature of the coal extract. When the sensor determines the viscosity and temperature are suitable for separation, the sensors may send a signal to a processor that controls a valve or a pump that facilitates transport of the coal extract from the reactor or holding tank to a separation unit, such as a centrifuge. In another example, sensors may be used to control transport of coal to the reactor, transport of the centrate to the distillation column, transport of volatiles captured throughout the system to a tank, transport of pitches distilled to a coker, and the like. Sensors may be used to measure the properties of the products of the process. Sensors may be used to provide realtime feedback during processing in order for an operator of the system to make manual adjustments or for a processor to make an automatic adjustment. Sensors may be used for safety purposes.

The methods and systems described herein may be deployed in part or in whole through a machine that executes computer software, program codes, and/or instructions on a processor. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents cited herein are hereby incorporated by reference.

What is claimed is:

1. A method of obtaining a de-ashed coal extract, comprising:
   exposing a coal to a hydrogenated vegetable oil in the presence of a coal-derived solvent to form a slurry;
   elevating the temperature of the slurry to facilitate liquefying the coal and liberating a volatile matter; and
   separating insoluble components from the slurry to obtain a de-ashed coal extract.

2. The method of claim 1, wherein water liberated as a result of the elevated temperature is captured and stored.

3. The method of claim 1, wherein the volatile matter is condensed and recycled.

4. The method of claim 1, further comprising, distilling the coal extract to obtain a pitch.

5. The method of claim 1, wherein the coal-derived solvent is selected from the group consisting of recycled liquefied coal, coal tar distillate, and coal tar pitch.

6. The method of claim 1, wherein the hydrogenated vegetable oil has a vapor pressure of less than 1500 psi at temperatures less than 400 degrees Celsius.

7. The method of claim 1, wherein separating comprises at least one of centrifugation, filtration, decanting, and float separation.

8. The method of claim 1, wherein the hydrogenated vegetable oil is at least one of soybean oil, peanut oil, canola oil, olive oil, other vegetable oil or combination of at least two of these oils.

9. The method of claim 1, wherein the temperature is elevated to between 300 degrees Celsius and 600 degrees Celsius.

10. The method of claim 1, further comprising agitating the slurry to facilitate liquefying the coal.

11. The method of claim 1, wherein the coal is selected from one or more of a sub-bituminous coal, lignite coal and an anthracite coal.

* * * * *